United States Patent
Hogan

(10) Patent No.: US 9,405,284 B2
(45) Date of Patent: Aug. 2, 2016

(54) IMPLEMENTING ENGINEERING UNIT CONVERSIONS ASSOCIATED WITH CONTROL DEVICES

(71) Applicant: Rockwell Automation Technologies, Inc., Mayfield Heights, OH (US)

(72) Inventor: Keith M. Hogan, Painesville, OH (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 0 days.

(21) Appl. No.: 15/008,412

(22) Filed: Jan. 27, 2016

(65) Prior Publication Data

US 2016/0147210 A1    May 26, 2016

Related U.S. Application Data

(63) Continuation of application No. 13/293,931, filed on Nov. 10, 2011, now abandoned.

(51) Int. Cl.
| | |
|---|---|
| G06F 17/30 | (2006.01) |
| G05B 19/042 | (2006.01) |
| G06F 17/28 | (2006.01) |
| G06F 15/02 | (2006.01) |

(52) U.S. Cl.
CPC ........ *G05B 19/0423* (2013.01); *G06F 15/0258* (2013.01); *G06F 17/289* (2013.01)

(58) Field of Classification Search
CPC ................................................. G06F 17/30914
See application file for complete search history.

(56) References Cited

U.S. PATENT DOCUMENTS

| | | | |
|---|---|---|---|
| 5,373,346 A | 12/1994 | Hocker | |
| 6,560,235 B1 | 5/2003 | Jones | |
| 8,756,041 B2 | 6/2014 | Maturana et al. | |
| 2002/0007279 A1* | 1/2002 | Matsuda | G06F 17/2827 704/277 |
| 2006/0179012 A1* | 8/2006 | Jacobs | G06Q 10/04 705/400 |

(Continued)

FOREIGN PATENT DOCUMENTS

| | | |
|---|---|---|
| CN | 2050188 U | 12/1989 |
| CN | 1194410 A | 9/1998 |

(Continued)

OTHER PUBLICATIONS

Chinese Office Action for Chinese Application No. 201210452691.X dated Sep. 16, 2014, 12 pages.

(Continued)

*Primary Examiner* — Mohammad S Rostami

(74) *Attorney, Agent, or Firm* — Amin, Turocy & Watson, LLP

(57) ABSTRACT

A converter component can efficiently manage conversion of data associated with a control system from one engineering unit (EU) type to another EU type, and/or conversion of the data from one language to another language, based at least in part on the user. The converter component can identify a user, or can receive a conversion selection(s) from the user, and can automatically select a specified subset of EU conversions and/or language conversions to employ in relation to the user, convert the data associated with the control system in accordance with the subset, and present the converted data to the user via the interface. The converter component can present a pre-populated table of EU conversions associated with the subset, and can allow a user to add or modify an EU conversion.

20 Claims, 14 Drawing Sheets

(56) References Cited

U.S. PATENT DOCUMENTS

| | | | |
|---|---|---|---|
| 2007/0079355 A1* | 4/2007 | Chand | G05B 19/054 726/2 |
| 2007/0142926 A1* | 6/2007 | Hopsecger | G05B 19/05 700/10 |
| 2008/0016445 A1* | 1/2008 | Dykes | G06Q 90/00 715/711 |
| 2008/0066058 A1* | 3/2008 | Aoyama | G06F 9/4448 717/125 |
| 2008/0221721 A1 | 9/2008 | Reed et al. | |
| 2008/0235143 A1* | 9/2008 | Beller | G06Q 50/06 705/63 |
| 2010/0050116 A1* | 2/2010 | Blick | G06F 19/366 715/808 |
| 2011/0282866 A1* | 11/2011 | Erickson | G06F 17/30516 707/722 |

FOREIGN PATENT DOCUMENTS

| | | |
|---|---|---|
| CN | 1247345 A | 3/2000 |
| CN | 2546951 Y | 4/2003 |
| CN | 201266374 Y | 7/2009 |

OTHER PUBLICATIONS

Chinese Office Action for Chinese Application No. 201210452691.X dated May 21, 2015, 7 pages.

Notice of Allowance for U.S. Appl. No. 13/293,931, dated Oct. 28, 2015, 23 pages.

Office Action for U.S. Appl. No. 13/293,931, dated Aug. 28, 2014, 41 pages.

Monitor: Silo Track Level Measurements Software, "Silo Track Inventory Management Software V3.5," http://www.monitortech.com/product_c_c_st.shtml, Feb. 10, 2012, 8 pages.

Multilizer—Innovative Translation & Localization Technologies: "Case Study—ABB Automation Systems AB, Crane Division, Sweden," http://www2.multilizer.com/company/case-studies/abbcase/; Feb. 10, 2012, 2 pages.

Honeywell Inc; "Honeywell: UDC3000 Versa-Pro Universal Digital Controller," Last accessed on Nov. 12, 2011, Feb. 10, 2012, 12 pages.

Office Action for U.S. Appl. No. 13/293,931 dated Jul. 8, 2015, 37 pages.

Final Office Action for U.S. Appl. No. 13/293,931 dated Mar. 26, 2015, 42 Pages.

* cited by examiner

FIG. 2

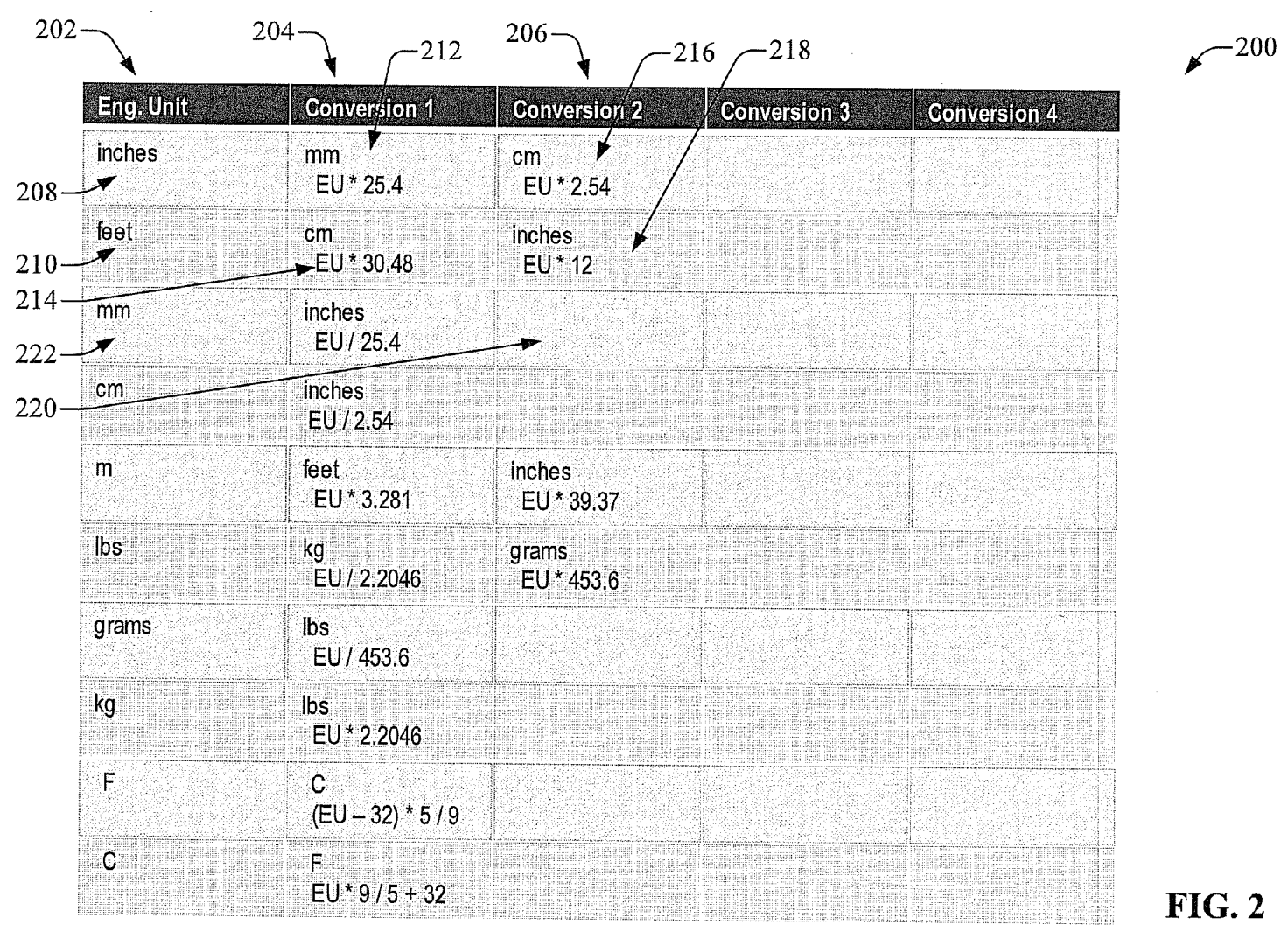

| Eng. Unit | Conversion 1 | Conversion 2 | Conversion 3 | Conversion 4 |
|---|---|---|---|---|
| inches | mm<br>EU * 25.4 | cm<br>EU * 2.54 | | |
| feet | cm<br>EU * 30.48 | inches<br>EU * 12 | | |
| mm | inches<br>EU / 25.4 | | | |
| cm | inches<br>EU / 2.54 | | | |
| m | feet<br>EU * 3.281 | inches<br>EU * 39.37 | | |
| lbs | kg<br>EU / 2.2046 | grams<br>EU * 453.6 | | |
| grams | lbs<br>EU / 453.6 | | | |
| kg | lbs<br>EU * 2.2046 | | | |
| F | C<br>(EU − 32) * 5/9 | | | |
| C | F<br>EU * 9/5 + 32 | | | |

IMPLEMENTING ENGINEERING UNIT CONVERSIONS ASSOCIATED WITH CONTROL DEVICES

CROSS-REFERENCE TO RELATED APPLICATION

This application is a continuation of, and claims priority to, U.S. patent application Ser. No. 13/293,931, filed Nov. 10, 2011, and entitled "IMPLEMENTING ENGINEERING UNIT CONVERSIONS ASSOCIATED WITH CONTROL DEVICES," the entirety of which is hereby incorporated herein by reference.

TECHNICAL STATEMENT

The subject disclosure relates to automation control, and more specifically, to implementing engineering unit conversions associated with control devices in an industrial control system.

BACKGROUND

Industrial control systems can be employed to regulate operation of equipment in an industrial environment, where operation of the equipment can include process(es) typically directed to accomplishment of a complex task or a streamlined, automated task, such as large scale manufacturing. Regulation of operation of the equipment and related process(es) typically exploits and produces substantive amounts of control data, which include, for example, configuration data such as controller code, human-machine interface (HMI) data, process recipe(s) and report definitions, or the like. In addition, operation of industrial control systems also produces both real-time and historical data about the status of regulated equipment and related process(es), the data including, for example, alarms, process values, and audit/error logs. To operate industrial control systems, various HMIs in the industrial environment render control data (real-time (or last known) and historical data) through operator interfaces which convey process overviews or equipment detail. Multiple operator interfaces can be created to provide rich information related to the various control processes implemented in the industrial control system so that the operator can switch between them to monitor various aspects of the equipment and related process(es) under control.

Conventional control systems typically present data, such as operation data, associated with a control system in engineering units that are static in nature. However, different users can desire different engineering units with regard to the same type of data. For example, one user may desire to view an item of data associated with a control device in inches, while another user may desire to view that item of data in centimeters. Certain conventional control systems have allowed a user to define engineering unit conversions on individual display fields on HMI devices. However, such conventional processes are time consuming and prone to errors.

Conventional control systems also typically present data associated with a control system in a particular language in a static manner. However, different users can desire viewing data associated with a control system in different languages.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary in order to provide a basic understanding of some aspects of the subject disclosure. This summary is not an extensive overview, and it is not intended to identify key/critical elements of the subject disclosure or to delineate any scope. The sole purpose of this summary is to present some concepts in a simplified form as a prelude to the more detailed description that is presented later.

The disclosed subject matter can be employed to efficiently manage conversion of data associated with a control system from one engineering unit (EU) type to another EU type, and/or conversion of the data from one language to another language, based at least in part on the user and/or the metadata (e.g., tag) associated with a control device of the control system. In accordance with various aspects, a converter component can identify a user, or can receive a conversion selection(s) from the user via a user interface (UI) component (e.g., Human Machine Interface (HMI)), and can automatically select a subset of conversion functions, comprising a specified subset of EU conversion functions, a specified subset of language conversion functions and/or a subset of conversion functions comprising both EU conversion functions and language conversion functions, to employ in relation to the user, convert the data associated with the control system in accordance with the subset of conversion functions, and present the converted data to the user via the UI component (e.g., during run time, or at another desired time). At a desired time (e.g., prior to run time, during run time), the converter component can present a pre-populated conversion table comprising EU conversion functions and/or a pre-populated table of language conversion functions to the user, and the user can select the desired EU conversion functions (e.g., select an entire set of EU conversion functions or individual EU conversion functions), language conversion functions (e.g., select an entire set of language conversion functions or individual language conversion functions) and/or hybrid conversion functions, comprising EU and language conversion functions, in the conversion table(s). In another aspect, the converter component can allow a user to add, modify or remove conversion function to, in or from a conversion table.

In accordance with various aspects, the disclosed subject matter can comprise a system that includes at least one processor configured to execute one or more sets of code instructions retained in at least one memory, the one or more sets of code instructions, when executed by the at least one processor, implement a group of components comprising: a user interface component configured to present a subset of items of data or a subset of converted items of data associated with a control system; and a converter component configured to identify a subset of conversion functions usable to convert at least a portion of the subset of items of data based at least in part on a subset of user preferences, and convert respective items of data of the subset of items of data to generate respective converted items of data of the subset of converted items of data, in accordance with respective conversion functions of the subset of conversion functions.

In accordance with various other aspects, the disclosed subject matter can include a method comprising employing at least one processor to execute code instructions retained in a memory, the code instructions when executed by the at least one processor perform at least the following group of acts, including the act of identifying a subset of conversion functions for use with a subset of items of data associated with a control system based at least in part on a subset of user preferences; and the act of automatically converting respective items of data of the subset of items of data to generate respective converted items of data of a subset of converted items of data, in accordance with respective conversion functions of the subset of conversion functions.

In accordance with still other aspects, the disclosed subject matter can comprise a computer program product comprising a computer-readable storage medium that retains computer-readable instructions that, in response to execution, cause a device to perform operations, comprising: identifying a subset of conversion functions for use with a subset of items of data associated with a control system based at least in part on a subset of user preferences; and converting respective items of data of the subset of items of data to generate respective converted items of data of a subset of converted items of data, in accordance with respective conversion functions of the subset of conversion functions.

To the accomplishment of the foregoing and related ends, certain illustrative aspects of the disclosed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 2 depicts an example conversion table in accordance with various aspects and embodiments of the disclosed subject matter.

DETAILED DESCRIPTION

Figure 1:
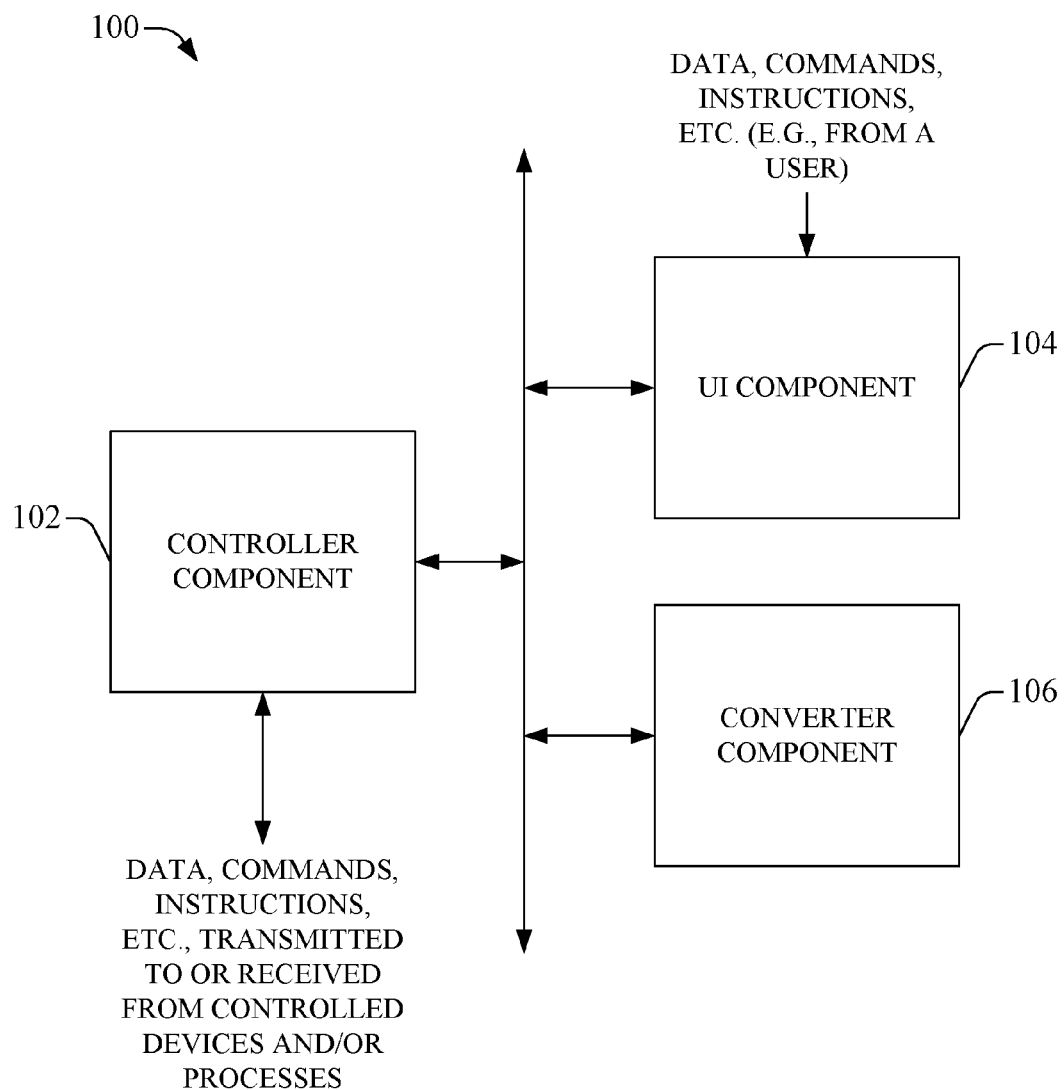
FIG. 1 illustrates a block diagram of an example system that can efficiently convert engineering units (EUs) for data associated with an industrial environment in accordance with various aspects and embodiments.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

Control system users (e.g., operators, maintenance technicians, etc.) prefer to have control system related data (e.g., process variables) presented to them in engineering units (EUs) (e.g., inches, feet (ft), millimeters (mm), centimeters (cm), meters (m), pounds (lbs), grams, kilograms (kg), degrees fahrenheit (° F.), degrees celsius (° C.), etc.) that are familiar to them. However, the EUs preferred by the users are not always the same as the EUs used in the programming of control devices associated with the control system. Conventional approaches to address this problem in a piecemeal fashion are inefficient, as such approaches are time consuming and prone to error.

To overcome the deficiencies of conventional systems and methods, the disclosed subject matter can be employed to efficiently manage conversion of data associated with an industrial environment from one EU type to another EU type, and/or conversion of the data from one language to another language, based at least in part on the user and/or metadata (e.g., tag) associated with a control device providing the data. In accordance with various aspects, a converter component can identify a user, or can receive a conversion selection(s) from the user via a user interface (UI) component (e.g., Human Machine Interface (HMI)), and can automatically select a specified subset of EU conversions and/or a specified subset of language conversions to employ in relation to the user, convert the data associated with the control system in accordance with the subset, and present the converted data to the user via the interface (e.g., during run time, or at another desired time). The converter component can present a pre-populated table of engineering EUs and/or a pre-populated table of language conversions to the user, and the user can select the desired EU conversion and/or language conversion from the table(s). In another aspect, the converter component can allow a user to add or modify an EU conversion or a language conversion to or in the respective tables.

As used in this application, the terms "component," "system," "platform," "layer," "controller," "terminal," "station," "node," "interface", "HMI", "client", and the like, can refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

In accordance with various embodiments, one or more controllers can be employed in an industrial control system. A controller can be embodied in a programmable automation controller (PAC), which can be a dedicated programmable logic controller (PLC), a personal computer (PC)-based controller, or the like. It is to be noted that a controller (e.g., PLC) can be a dedicated piece of hardware that is self contained or, in the case of a "soft controller" (e.g., "soft PLC"), a piece of software that runs on a computer and provides controller-like control. For instance, in the case of a soft controller, code can be extracted by the soft controller to access a project database directly to extract name information.

A terminal can communicate with the controller and/or other devices, such as an input/output (I/O) module, drives, motion controllers, process instruments, sensors, etc., in or associated with a control platform associated with the industrial control system. Control code and control data structures in the control platform can represent control logic that can administer equipment, and related processes, functionally coupled to the control platform. In an aspect, control platform is an industrial automation control environment and the control logic is automation control logic. To facilitate operation of the control system, control logic can be developed during design time, wherein the control logic can be implemented (e.g., executed) at run time. During design time (e.g., in the design environment), in an aspect, instruction(s), data type(s), and metadata tag(s) that comprise control code can be produced and retained as part of configuration, or composition, of a control project or application for use in operations for the control system (e.g., during run time).

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the terms "set" or "subset" as employed herein exclude the empty set; e.g., the set with no elements therein. Thus, a "set" or a "subset" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a block diagram of an example system 100 that can efficiently convert EUs for data associated with an industrial environment in accordance with various aspects and embodiments. The system 100 can comprise a controller component 102 that includes one or more controllers (e.g., PLC) that can be employed to control devices (e.g., a roller, a station, a welder, a scanner, a belt conveyor, etc.) or processes (e.g., mixing process, extruding process, injection molding process, welding process, melting process, baking process, stirring process, measuring process, etc.) in the industrial environment. Devices also are referred to herein as control devices or automation devices. For instance, the controller component 102 can be employed to control devices and processes in the controlled system portion (e.g., the portion being controlled by the controller component 102) of the industrial environment.

In an aspect, the system 100 also can include a user interface (UI) component 104 (e.g., a HMI, one or more UIs contained within a HMI, or one or more UIs associated with a HMI) that can be communicatively coupled to the controller component 102 in the industrial environment. The UI component 104 can comprise one or more UIs, such as a display screen(s) (e.g., graphical UI (GUI), touch screen GUI), input(s), output(s), keyboard, mouse, trackpad, etc., as more fully disclosed herein, wherein the UIs can be employed to receive input from a user (e.g., operator, maintenance technician, etc.) or present information relating to the industrial environment (e.g., information relating to the devices and processes in the industrial environment) to the user.

To overcome the deficiencies of conventional systems, in accordance with various aspects and embodiments, the system 100 can comprise a converter component 106 that can be communicatively coupled to the controller component 102 and UI component 104 in the industrial environment, and can convert data associated with the industrial environment from a first type of EU to a second type of EU, and/or convert the data from a first language to a second language, based at least in part on the user and/or a tag(s) associated with the data. For instance, a subset of tags associated with a subset of automation devices can respectively provide data in respective EUs, wherein, for example, a first tag can be associated with a first piece of data expressed in an EU of inches, and a second tag can be associated with a second piece of data expressed in an EU of pounds. However, a user can desire that the first piece of data be expressed in centimeters and the second piece of data be expressed in kilograms when such pieces of data are presented to the user on the display screen of the UI component 104. In an aspect, the converter component 106 can convert the subset of data items, respectively, from a first subset of EUs to a second subset of EUs preferred by a user using a subset of conversions. For instance, the converter component 106 can read or otherwise identify respective EUs of respective data items based at least in part on metadata (e.g., tags) respectively associated with the data items and obtained from the automation device(s) (e.g., controller) associated with the data items, and the respective data items can be converted by the converter component 106 using respective conversion functions and can be displayed by the UI component 104 with data values corresponding to the desired respective EUs and/or with information (e.g., EU labels) displayed in a desired language. In accordance with various aspects, the subset of conversions can be based at least in part on the language (e.g., English, German, French, Spanish, Italian, Japanese, Chinese, etc.) desired by the user, an industry EU standard typically applicable in the region (e.g., country) where the industrial environment is being utilized, or another desired basis.

For example, with regard to data associated with an automation device, a piece of data associated with a tag preferably is expressed in the EU of inches in an English speaking country like the United States, while in a German speaking country like Germany, the piece of data associated with the tag is preferably expressed in the EU of centimeters, and while in a French speaking country like France, the piece of data associated with the tag is preferably expressed in the EU of millimeters. If the piece of data is expressed in the EU of inches by the tag, but the user speaks French and/or is used to utilizing the EU standard (e.g., regional industry standard relating to EUs) associated with France, the user can utilize the converter component 106, via the UI component 104, to select the conversion function applicable to convert the piece of data from the EU standard applicable to the United States to the EU standard applicable to France, and/or can convert the language from English to French, when presenting the piece of data to the user via the UI component 104 (e.g., the display can be switched from a first language to a second language so that information relating to the data associated with the control system is presented in the second language, in accordance with the selected conversion function(s)). The disclosed subject matter can extend such conversion globally, wherein, in an aspect, the converter component 106 can globally apply (e.g., automatically) the subset of conversions to convert a subset of data from a first type of EU standard and/or first language to a second type of EU standard and/or second language based at least in part on selection of the subset of conversions by the user via the UI component 104, or automatic selection of the subset of conversions by the converter component 106 based at least in part on identification or authentication of the user by the converter component 106.

In accordance with an aspect, the UI component 104 can comprise more than one display screen or can split a display screen into more than one portion (e.g., more than one display window). The converter component 106 can convert (e.g., transform) respective items of data associated with respective tags from a first subset of EUs and/or first language to a second subset of EUs and/or second language for presentation in a first display portion of the UI component 104 to a first user (e.g., in accordance with the user preferences of the first user), and can convert the respective items of data associated with respective tags from a first subset of EUs and/or first language to a third subset of EUs and/or third language for presentation in a second display portion of the UI component 104 to a second user (e.g., in accordance with the user preferences of the second user).

In still another aspect, there can be a first UI component 104 and a second UI component 104 (e.g., a remote UI component 104 associated with a separate terminal), wherein the first UI component 104 can be utilized by the first user and the second UI component 104 can be utilized by the second user. The converter component 106 can convert the respective items of data associated with respective tags from a first subset of EUs and/or first language to a second subset of EUs and/or second language for presentation on a first display screen of the first UI component 104 to the first user (e.g., in accordance with the user preferences of the first user), and can convert the respective items of data associated with respective tags from a first subset of EUs and/or first language to a third subset of EUs and/or third language for presentation on a second display screen of the second UI component 104 to the second user (e.g., in accordance with the user preferences of the second user).

In yet another aspect, the converter component 106 can include one or more tables, such as a conversion table (e.g., EU conversion table, language-based conversion table, or a hybrid EU and language conversion table), wherein a table can comprise, for example, a subset of EU conversions (e.g. conversion functions), a subset of language conversions, and/or a subset of language and EU conversions, which can be used to convert data (e.g. convert data values) associated with automation devices in the industrial environment. A conversion table can include cells, such as a base cell and a conversion cell, wherein a base cell can include the EU employed in relation to a piece of data associated with the control system in the industrial environment, and a conversion cell, corresponding to or linked to a base cell, can comprise a corresponding conversion function that can be used by the converter component 106 to convert a value of a piece of data expressed in an EU associated with a base cell to another value that expresses the piece of data using a different EU corresponding to the different EU associated with the conversion cell.

In accordance with various aspects or embodiments, the converter component 106 can generate or provide one or more menus to a user via the UI component 104, wherein the one or more menus can include items, such as EUs, EU conversion functions, language conversion functions, etc., that can be selected by the user to facilitate selecting a subset of conversion functions, creating or modifying a conversion function, populating a table with conversion functions, etc. A menu can be presented via selection of an item in a tool bar or selection of a cell in a table, wherein selection of the menu item can result in presentation of a menu (e.g., drop down menu presented at or near the selected item or cell) and/or a separate menu screen can be presented to the user via the UI component 104.

With regard to EU translations, a table can comprise a first column comprising a plurality of typical EUs associated with the control system. The table can include a specified number of other columns that respectively can be used for a specified number of different subsets of EU conversions to be performed on data (e.g., convert a first EU to a second EU).

With regard to language translations, a table can comprise a first column comprising a plurality of typical EUs associated with the control system. The table also can include a specified number of other columns that respectively can be used for a specified number of different language translations, EU conversion specifications (e.g., base EU associated with a tag is in inches, and the EU conversion specification provides that the data item is to be presented in millimeters, for example, in accordance with a language or regional industry standard), and/or EU conversions to be performed on data (e.g., corresponding to the EU standards employed by the region associated with the language translation (e.g., English to French language translation corresponding to use of the French industry standard with regard to EU conversions)).

Referring briefly to FIG. 2 (along with FIG. 1), depicted is a diagram of an example conversion table 200 in accordance with various aspects and embodiments of the disclosed subject matter. The table 200 can include a base subset of EUs 202 that can comprise and define specified EUs contained in a column of the table 200. As desired, the manufacturer, programmer, or other user can insert a subset of predefined EUs in the column for the base subset of EUs 202 and/or a user can modify the base subset of EUs 202 to add, remove, or otherwise modify an EU in the base subset of EUs 202.

In an aspect, the table 200 can include a plurality of subsets of conversions, comprising, for example, Conversion 1 (204) and Conversion 2 (206), which can be contained in one or more other columns of the table 200, wherein the columns can include a subset of cells (e.g., conversion cells). Each of the plurality of subsets of conversions can be employed to convert respective EUs to different EUs (or not convert a certain EU when desired), wherein each conversion in a subset can correspond to a respective function (e.g., conversion function), which accurately converts data from one EU to another EU.

For example, the base subset of EUs 202 can comprise a number of EUs, including inches contained in cell 208 and feet in cell 210. The table 200 can include a column for Conversion 1 (204), wherein the column can include cell 212 that can be employed to convert data that is based on an EU of inches to millimeters, wherein the cell 212 can provide a function that can be employed by the converter component 106 to convert data associated with a tag from inches to millimeters for presentation to the user via the UI component 104; and can include cell 214 that can be employed to convert data that is based on an EU of feet to centimeters, wherein the cell 214 can provide a function that can be employed by the converter component 106 to convert data associated with a tag from feet to centimeters for presentation to the user via the UI component 104. For instance, with regard to cell 212, the function can be EU*25.4, wherein the value of EU can be a parameter value expressed in the base EU (in the tables 200 and 300 of FIGS. 2 and 3, respectively, "EU" in the conversion function can represent the base EU that is associated with the metadata associated with the particular item of data being converted), which is inches in this instance, in the cell 208, and the converter component 106 can multiply the value of the piece of data associated with a tag by a factor of 25.4, based at least in part on the conversion function in the cell 212, to obtain a result for the piece of data expressed in millimeters, wherein the result can be presented to the user via the UI component 104. Similarly, with regard to cell 214, the function contained therein can be EU*30.48, wherein the value of EU can be a parameter value expressed in the base EU, which is feet in this instance, in the cell 210, and the converter component 106 can multiply the value of another piece of data (e.g., associated with another tag) by a factor of 30.48, based at least in part on the conversion function in the cell 214, to obtain a result for this other piece of data expressed in centimeters, wherein the result can be presented to the user via the UI component 104. As shown in the table 200, Conversion 1 (204) also can include other conversion cells comprising corresponding conversion functions.

As another example, the table 200 can include a column for Conversion 2 (206), wherein the column can include cell 216 that can be employed to convert data that is based on an EU of inches to centimeters, wherein the cell 216 can provide a function that can be employed by the converter component 106 to convert data associated with a tag from inches to centimeters for presentation to the user via the UI component 104; and can include cell 218 that can be employed to convert data that is based on an EU of feet to inches, wherein the cell 218 can provide a function that can be employed by the converter component 106 to convert data associated with a tag from feet to inches for presentation to the user via the UI component 104. For instance, with regard to cell 216, the function can be EU*2.54, wherein the value of EU can be a parameter value expressed in the base EU, which is inches in this instance, in the cell 208, and the converter component 106 can multiply the value of the piece of data associated with a tag by a factor of 2.54, based at least in part on the conversion function in the cell 216, to obtain a result for the piece of data expressed in centimeters, wherein the result can be presented to the user via the UI component 104. Similarly, with regard to cell 218, the function contained therein can be EU*12, wherein the value of EU can be parameter value expressed in the base EU, which is feet in this instance, in the cell 210, and the converter component 106 can multiply the value of another piece of data (e.g., associated with another tag) by a factor of 12, based at least in part on the conversion function in the cell 218, to obtain a result for this other piece of data expressed in inches, wherein the result can be presented to the user via the UI component 104. As shown in the table 200, Conversion 2 (206) also can include other conversion cells comprising corresponding conversion functions.

In accordance with another aspect, the table 200 can include a cell, such as cell 220, that is a blank cell, which can be employed, for example, when it is not desired to convert the value of a piece of data from the corresponding EU in the corresponding cell (e.g., 222) in the base subset of EUs 202 to a different value. In such instance, the piece of data can be presented to the user via the UI component 104 without converting the piece of data or by multiplying the value of the piece of data by 1. Alternatively or additionally, a conversion cell can employ a unitary function, such as EU*1, that can multiply a value of a piece of data by a factor of 1 to obtain a result equivalent to the value of the piece of data, wherein the result can be presented to the user via the UI component 104.

Figure 3:
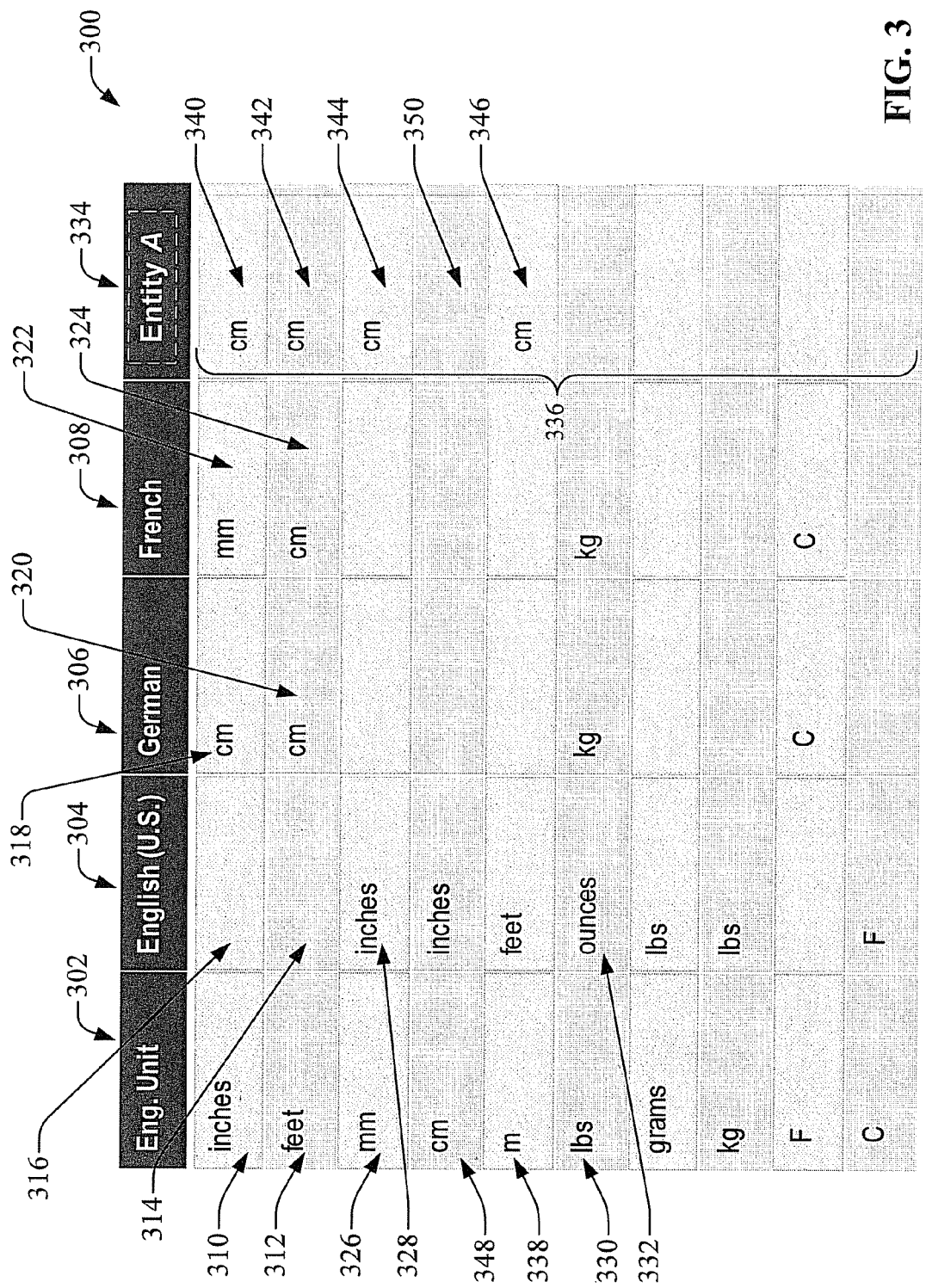
FIG. 3 presents a diagram of another example conversion table that can convert data values based at least in part on a language selection in accordance with various aspects and embodiments of the disclosed subject matter.

Referring briefly to FIG. 3 (along with FIG. 1), depicted is a diagram of another example conversion table 300 that can convert data values based at least in part on a language selection in accordance with various aspects and embodiments of the disclosed subject matter. The table 300 can include a base subset of EUs 302 that can comprise and define specified EUs contained in a column of the table 300. As desired, the manufacturer, programmer, or other user can insert a subset of predefined EUs in the column for the base subset of EUs 302 and/or a user can modify the base subset of EUs 302 to add, remove, or otherwise modify an EU in the base subset of EUs 202. The converter component 106 can employ the conversion table 300 in conjunction with the table 200 depicted in FIG. 2, by itself, or employed with another conversion table.

In another aspect, the table 300 can include a plurality of subsets of conversions, comprising, for example, the subset of English EU conversions 304, the subset of German EU conversions 306, and the subset of French EU conversions 308, which can be contained in other columns of the table 300, wherein each of the columns can include a subset of cells (e.g., conversion cells). Each of the plurality of subsets of conversions can be employed to convert respective EUs from the EUs utilized in the base subset of EUs 302 to different EUs (or not convert a certain EU when desired) in accordance with the respective subset of conversions, wherein each conversion in a subset can correspond to a respective conversion function, which can accurately convert data from one EU to another EU.

For example, the base subset of EUs 302 can comprise a number of EUs (e.g. in English EUs), including inches contained in cell 310 and feet in cell 312. The table 300 can include a column for the subset of English EU conversions 304, wherein the column can include cell 316 that can correspond to the English EU of inches and, in this example instance, can be left blank since the corresponding base EU in cell 310 also is expressed in inches; and can include cell 314 that can correspond to the English EU of feet and, in this example instance, can be left blank since the corresponding base EU in cell 312 also is expressed in feet.

As further example, the table 300 can include a column for the subset of German EU conversions 306, wherein the column can include cell 318 that can be employed to convert data that is based on an EU of inches to a value expressed in an EU of centimeters. In accordance with various embodiments, the cell 318 can provide information, such as a desired type of conversion (e.g., inches to centimeters) to another conversion table (e.g., table 200) so that the other conversion table can be aware of the data conversion to be performed (e.g., convert inches to centimeters) and can be employed to facilitate converting the data via the converter component 106; and the cell 320 can provide information, such as a desired type of conversion (e.g., feet to centimeters) to another conversion table (e.g., table 200) so that the other conversion table can be aware of the data conversion to be performed (e.g., convert feet to centimeters) and can be employed to facilitate converting the data via the converter component 106. As shown in the table 300, the subset of German EU conversions 306 also can include other conversion cells comprising corresponding conversion functions.

As still another example, the table 300 can include a column for the subset of French EU conversions 308, wherein the column can include cell 322 that can be employed to convert data that is based on an EU of inches to a value expressed in the EU of millimeters (e.g., in contrast to the conversion of the data value from the EU of inches to the EU of centimeters with regard to the German language in the subset of German EU conversions 306). In accordance with various embodiments, the cell 322 can provide information, such as a desired type of conversion (e.g., inches to millimeters) to another conversion table (e.g., table 200) so that the other conversion table can be aware of the data conversion to be performed (e.g., convert inches to millimeters) and can be employed to facilitate converting the data via the converter component 106; and the cell 324 can provide information, such as a desired type of conversion (e.g., feet to centimeters) to another conversion table (e.g., table 200) so that the other conversion table can be aware of the data conversion to be performed (e.g., convert feet to centimeters) and can be employed to facilitate converting the data via the converter component 106. As shown in the table 300, the subset of French EU conversions 308 also can include other conversion cells comprising corresponding conversion functions.

As yet another example, there can be an instance where a piece of data associated with a tag (associated with an automation device of the control system) can be expressed in a first EU type (e.g., millimeters), such as in cell 326, associated with a first language (e.g., English language), wherein the preferred EU is a second EU type (e.g., inches), such as depicted in cell 328, which, in this instance, also is associated with the first language. In such an instance, the cell 328 can provide information, such as a desired type of conversion (e.g., millimeters to inches) to another conversion table (e.g., table 200) so that the other conversion table can be aware of the data conversion to be performed (e.g., convert millimeters to inches) and can be employed to facilitate converting the data via the converter component 106.

There can be instances where a user can desire to display data represented using a first type of EU (e.g., pounds (lbs)) associated with a language (e.g., English Units for the United Stated) using a second type of EU (e.g., ounces) that also is associated with the same language. For instance, the base subset of EUs 302 can be in English units, and the subset of English EU conversions 304 can enable conversion of a first type of EU in a first language (e.g., English language) to a second type of EU in the first language. For example, the subset of EUs 302, which is in English, can include an EU representing weight, such as pounds (lbs), as contained in cell 330. In some implementations, it can be desired to have data, such as tag data associated with the control system, which is presented using the English language EU of pounds converted and represented in the English language EU of ounces. In such implementations, in the table 300, the subset of English EU conversions 304 can include cell 332 that can indicate or include the English EU of "ounces" (or "oz"), and the cells 330 and 332 can be used to facilitate converting data (e.g., data associated with a tag of an automation device) represented in the English EU of pounds to the English EU of ounces for presentation via, for example, the UI component 104. The converter component 106, using or referencing the table 300, including cell 330 and cell 332, can identify instances where data (e.g., tag data) is represented in the English EU of pounds and can convert the values of data represented in pounds to different data values corresponding to ounces, in accordance with a corresponding conversion factor that can be used to convert data from pounds to ounces (e.g., x pounds=(x*16) ounces). The converter component 106 can generate and/or include a mapping of the cell 330, the cell 332, and the corresponding conversion function or factor (e.g., x pounds=(x*16) ounces). The converter component 106 can facilitate providing (e.g., to a user) the converted data (e.g., data represented in the EU of ounces) via an interface (e.g., display screen associated with an HMI and/or UI component 104).

In certain instances, a user(s) can desire to create a custom subset of EU conversions, such as, for example, a unique subset of EU conversions usable or applicable to a an entity (e.g., a company, a work group, a class of users, etc.), a work project, a particular controlled system, etc. In accordance with some implementations, a user can input information via the UI component 104 to facilitate generating a custom subset of EU conversions that can be inserted in the table 300 or another table to facilitate conversion of data from one EU type to another EU type, in accordance with the custom subset of EU conversions. For instance, the UI component 104 can receive information from a user to generate a custom subset of EU conversions 334 for Entity A, and the converter component 106 can generate a column for the custom subset of EU conversions 334 associated with the Entity A. The custom subset of EU conversions 334 can comprise a subset of cells 336 that can contain information to facilitate conversion of data from a first EU type to a second EU type by the converter component 106, in accordance with the custom subset of EU conversions 334.

For example, a user associated with Entity A can desire that, with regard to work projects associated with Entity A, data relating to length be converted to the EU of centimeters, if not already expressed in the EU of centimeters. The user can input information to the UI component 104 to facilitate generating a custom subset of EU conversions 334 that can be used to convert data relating to length to present such data using the EU of centimeters. The converter component 106 can receive the input information (or information relating thereto) and, in response, can generate the custom subset of EU conversions 334 and/or a mapping between respective cells (e.g., cell 310, cell 312, cell 326, cell 338, etc.) of the base subset of EUs 302, the respective cells (e.g., cell 340, cell 342, cell 344, cell 346) of the subset of custom EU conversions 334, and the respective conversion functions applicable to respective cells. The converter component 106 can store the custom subset of EU conversions 334 and/or the associated mapping information in the table 300, which can be stored in a data store.

For instance, as depicted in the custom subset of EU conversions 334, when the obtained data (e.g., tag data) is represented in the EU of inches, the cell 340, which is associated with cell 310 relating to the EU of inches, can specify that such data is to be converted from inches to the EU of centimeters; when the obtained data (e.g., tag data) is represented in the EU of inches, the cell 340 can specify that such data is to be converted from inches to the EU of centimeters, and the converter component 106 can convert data represented in inches to a different data value corresponding to the EU of centimeters. The converter component 106 also can apply respective conversion functions and mappings to convert data from the EU of feet to the EU of centimeters (e.g., in relation to cell 312 and cell 342), convert data from the EU of millimeters to the EU of centimeters (e.g., in relation to cell 326 and cell 344), and/or convert data from the EU of meters to the EU of centimeters (e.g., in relation to cell 338 and cell 346). In accordance with various aspects, since cell 348 of the base subset of EUs 302 relates to data represented in the EU of centimeters, the cell 350 of the custom subset of EU conversions 334 can be left blank, which can result in no conversion of data that is already represented in centimeters. A user, such as a user associated with Entity A, can use the UI component 104 (e.g., using an HMI) to select the custom subset of EU conversions 334 when desired.

There also can be other instances where a user can desire to have an EU displayed in a different language but does not want the data value numerically converted from being expressed using a first EU associated with the tag to a second EU associated with the different language. For example, a user can switch the language on the UI component 104 from English to German, but can desire the EU to remain as pounds, as it was in the subset of English EU conversions 304, instead of kilograms as it typically would be in the subset of German EU conversions 306, however, wanting "pounds" to be expressed in the German language, which is "pfund".

In accordance with various aspects, the converter component 106 via the UI component 104 can enable the user to convert the language of the information (e.g., displayed EU) associated with the data, which is associated with a tag of an automation device, from a first language to a second language without converting the value of the data or the EU. For instance, the converter component 106 can comprise a conversion table that contains conversion functions to translate information (e.g., EU labels) associated with the data from a first language to a second language, but the cell that would be used for an EU conversion relating to the particular EU (e.g., pounds) can be left blank (e.g., instead of inserting an EU conversion function that would convert the data value from pounds to kilograms), wherein the blank EU conversion cell can indicate to the converter component 106 that the EU for that particular type of data (e.g., data relating to weight expressed in "pounds") is not to be converted from "pounds", so, as a result, the converter component 106 can utilize the translated string for this EU in the selected language (e.g., German), while using the original EU string with regard to the EU. Additionally or alternatively, the user could utilize the converter component 106, via the UI component 104, to create a conversion function, which can be inserted into a conversion table, wherein the conversion function can be structured to maintain the original EU for the particular type of data (e.g., weight data expressed in "pounds") as it is presented by the tag and associated automation device, but translate the information (e.g., EU labels) associated with the data into a different language than the original language associated with the tag.

The disclosed subject matter, by employing global conversion tables that can be pre-populated with a plurality of typical EUs, and corresponding EU conversions, as well as predefined language conversions and specified EU conversions relating to regional industry standards, can more efficiently manage data conversions, as compared to conventional systems and methods. The user already can have the typical EU conversions available to the user when operating the HMI associated with a control system, and only would have to modify a conversion table to create or select EU conversions unique to the user or to append additional language types. For instance, a user can select an EU, EU conversion, and/or language from an enumerated list(s) of available (e.g., predefined) EUs, EU conversions, and/or languages, which can reduce or minimize errors relating to data conversions. The disclosed subject matter further can allow users to define EUs to be used for various different languages or regional industry standards. The disclosed subject matter can thereby save time and effort by users in using and applying data conversions associated with a control system, as compared to the conventional techniques. Further, the disclosed subject matter can reduce or minimize errors relating to data conversions associated with a control system.

It is to be appreciated and understood that, while various components (e.g., controller component 102, UI component 104, converter component 106) of system 100 are depicted as stand-alone units, the disclosed subject matter is not so limited, as, in accordance with various aspects and embodiments, a component can be a stand-alone unit, can be contained within another component, or can have portions distributed among several other components. In accordance with various embodiments and aspects, the converter component 106 can be a stand-alone unit (as depicted in FIG. 1), can be contained within an HMI (or another component), can be contained within the controlled system (e.g., the portion of the system that contains the controlled devices and/or processes), or can have portions of the converter component 106 distributed among several other components and/or a portion that is stand-alone. In some implementations, the converter component 106 can be contained within the controlled system, which also can include the controlled devices and/or processes being controlled by the controller component 102, and the converter component 106 can perform EU conversions on data associated with the controlled system, as more fully disclosed herein, and can provide (e.g., transmit, present) the converted data (and/or the unconverted raw data) to another component, such as a HMI and/or UI component 104. In other implementations, the converter component 106 can be contained within a HMI and/or UI component 104, and the converter component 106 can receive data associated with the controlled system from the controlled system, components associated with the controlled system, etc., and can perform EU conversions on such data, as more fully disclosed herein, and can provide (e.g., transmit, present) the converted data (and/or the unconverted raw data) for presentation (e.g., display) by the HMI and/or UI component 104

Figure 4:
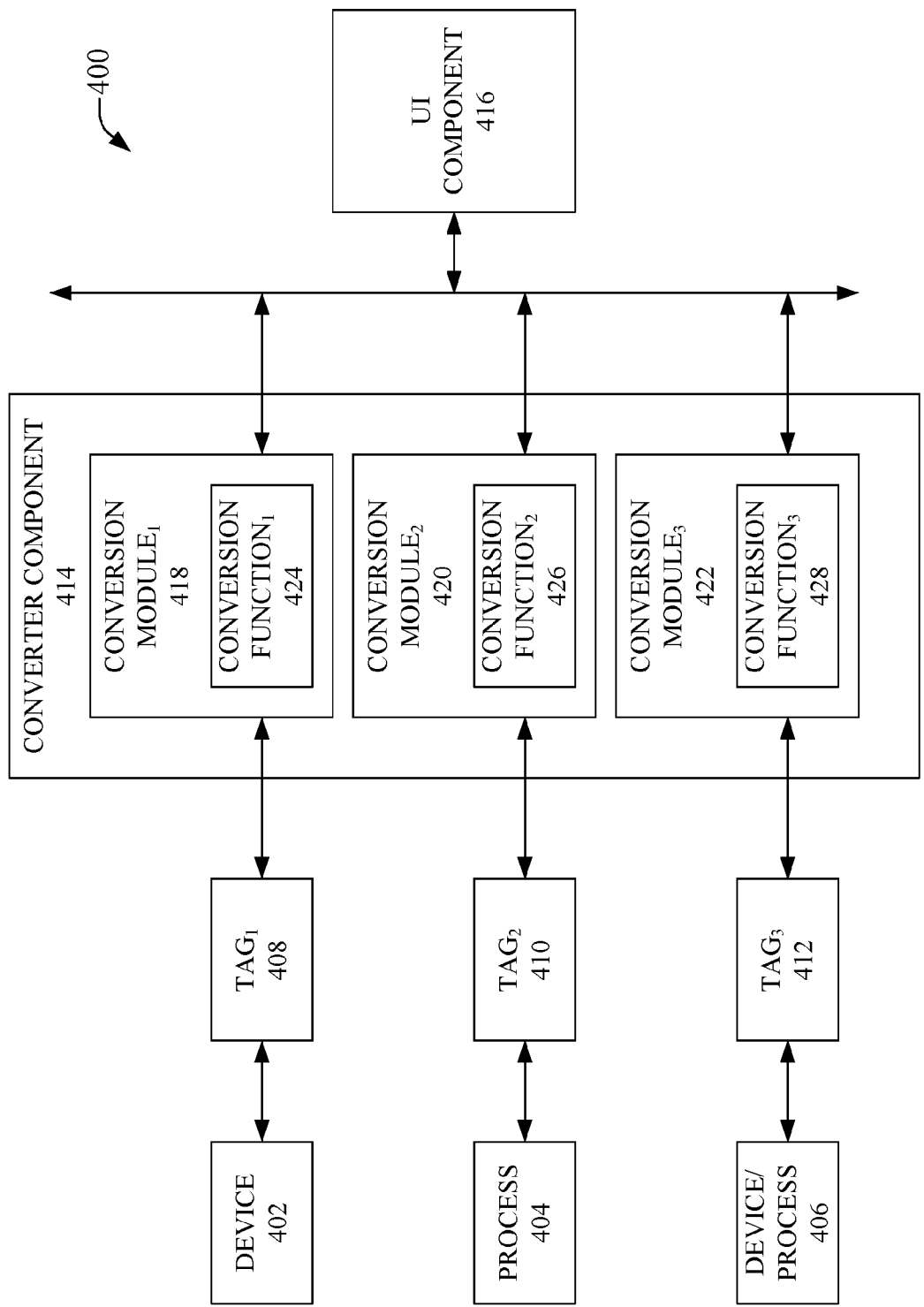
FIG. 4 illustrates a diagram of an example system that can efficiently convert EUs for data associated with a device and/or process in an industrial environment in accordance with various aspects and embodiments.

Turning to FIG. 4, depicted is a block diagram of an example system 400 that can efficiently convert EUs for data associated with a device and/or process in an industrial environment in accordance with various aspects and embodiments. The system 400 can include a plurality of devices and/or processes, including, for example, device 402, process 404, and/or device/process 406, which can be part of an industrial environment, wherein the devices and/or processes can be as more fully described herein. The system 400 can include a plurality of tags, including $tag_1$ 408, $tag_2$ 410, and $tag_3$ 412, that can be respectively associated with the plurality of devices and/or processes, wherein a tag can comprise or be associated with data relating to the device and/or process (e.g., operation data, measurement data, operational settings data, etc.) associated with the tag. While only a single tag is shown with regard to a particular device and/or process (e.g., 402, 404, 406), the disclosed subject matter is not so limited, as there can be virtually any desired number of tags associated with a particular device and/or process, as desired.

In another aspect, the system 400 can include a converter component 414 that can be employed to convert data from a first type of EU to a second type of EU, and/or from a first language to a second language, based at least in part on the user (e.g., and associated user preferences) associated with the devices and/or processes, wherein the user can be associated with the devices and/or processes via a UI component 416. The converter component 414 can be communicatively connected to the plurality of tags, including $tag_1$ 408, $tag_2$ 410, and $tag_3$ 412, and/or the plurality of devices and/or processes, including, device 402, process 404, and/or device/process 406, wherein the converter component 414 can receive and analyze information, including items of data respectively associated with the plurality of tags (e.g., 408, 410, 412), and can convert such items of data in accordance with respective conversion functions to generate converted items of data that can be presented to the user via the UI component 416.

In an aspect, the converter component 414 can comprise a plurality of conversion modules, including, for example conversion module$_1$ 418, conversion module$_2$ 420, and conversion module$_3$ 422, that can be employed to facilitate converting data in accordance with a respective plurality of conversion functions, including, for example, conversion function$_1$ 424, conversion function$_2$ 426, and conversion function$_3$ 428, wherein the plurality of conversion functions can be part of the subset of conversion functions that can convert the items of data to present the items of data using the EUs (e.g., which also can be determined based in part on a regional industry standard (e.g., French industry standard, German industry standard)), and/or language desired by the user. The conversion module or conversion function employed with regard to a particular item of data can be determined based at least in part on user preferences, EU and/or language associated with the particular item of data in relation to the associated tag, the EU and/or language desired as an output for presentation to the user, and/or other predefined data conversion criteria. The respective conversion functions can be contained in or derived from one or more conversion tables, such as Table 200 and/or Table 300.

For example, user preferences associated with a particular user specifies that the user desires the items of data associated with the respective tags to be presented to the user, via the UI component 416, in French language with the EUs typically used by French industry standards or customs, if $tag_1$ 408 is associated with a first item of data that is expressed English units of inches, the converter component 414 can employ conversion module$_1$ 418 using a conversion function$_1$ 424 that is derived from, and/or is referenced from, Table 200 and Table 300 to convert the first item of data from the EU of inches to the EU of millimeters (e.g., in accordance with Conversion 1 in Table 200, and the French standard of converting the EU of inches to the EU of millimeters in accordance with Table 300). Similarly, if $tag_2$ 410 is associated with a second item of data that is expressed English units of feet, the converter component 414 can employ conversion module$_2$ 420 using a conversion function$_2$ 426 that is derived from, and/or is referenced from, Table 200 and Table 300 to convert the second item of data from the EU of feet to the EU of centimeters (e.g., in accordance with Conversion 1 in Table 200, and the French standard of converting the EU of feet to the EU of centimeters in accordance with Table 300). Similarly, if $tag_3$ 412 is associated with a third item of data that is expressed English units of pounds, the converter component 414 can employ conversion module$_3$ 422 using a conversion function$_3$ 428 that is derived from, and/or is referenced from, Table 200 and Table 300 to convert the third item of data from the EU of pounds to the EU of kilograms (e.g., in accordance with Conversion 1 in Table 200 (e.g., EU (of kilograms)=EU (of pounds)/2.2046), and the French standard of converting the EU of pounds to the EU of kilograms in accordance with Table 300). The converter component 414 can communicate the converted first, second, and third items of data to the UI component 416, wherein the converted first, second, and third items of data can be presented to the user via the UI component 416 (e.g., via a display screen, via an audio output, etc.).

Figure 5:
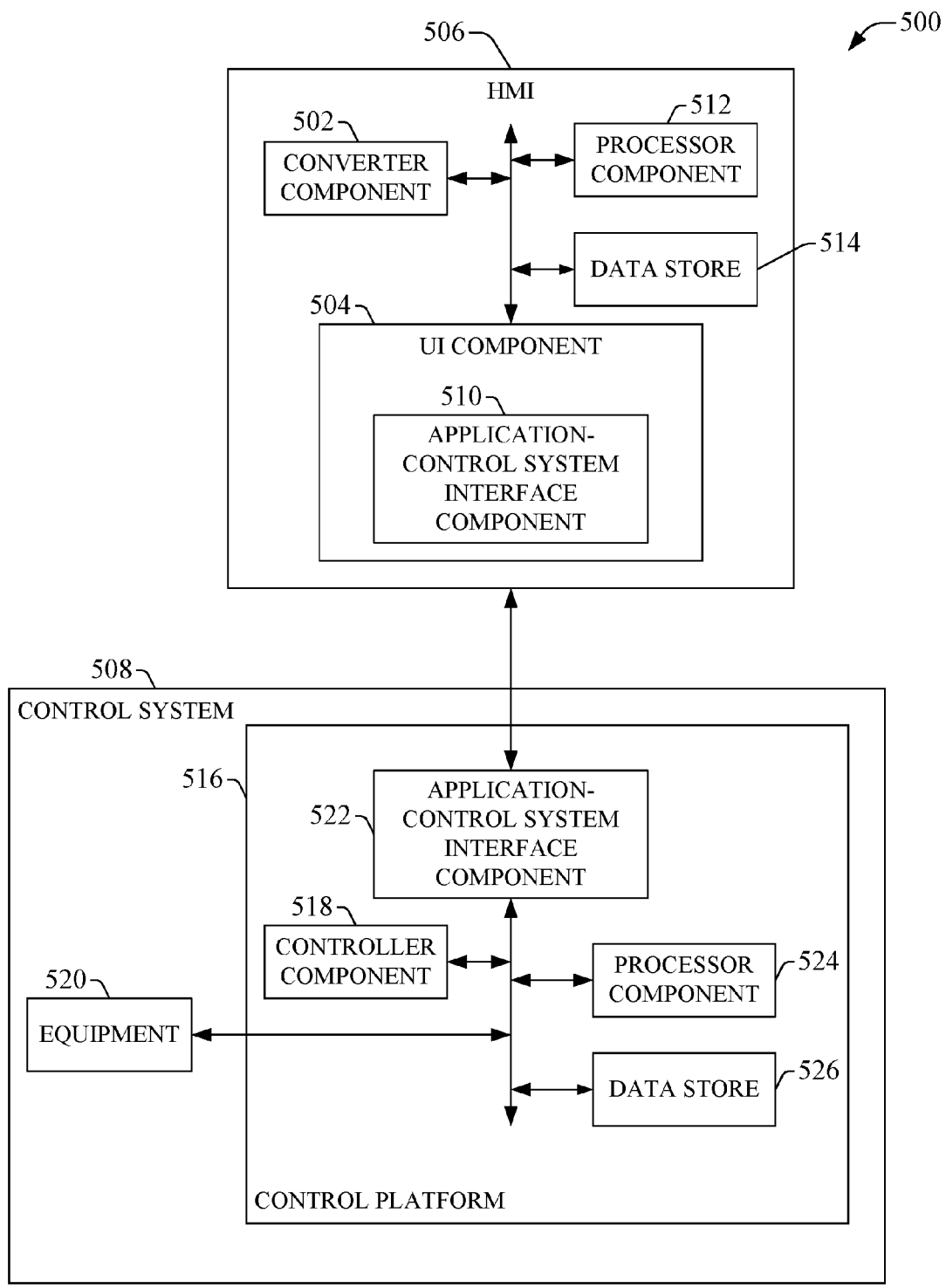
FIG. 5 depicts a diagram of an example system that can efficiently convert EUs for data associated with an industrial environment in accordance with various aspects and embodiments.

FIG. 5 is a block diagram that illustrates an example system 500 that can efficiently convert EUs for data associated with an industrial environment in accordance with various aspects and embodiments. In an aspect, the system 500 can comprise a converter component 502 and a UI component 504, wherein the converter component 502 and UI component 504 each can respectively can be the same or similar to, and/or can comprise the same or similar functionality as, respective components (e.g., respectively named components), as more fully disclosed herein. The UI component 504 can include a plurality of UIs (e.g., GUI, touch screen GUI, keyboard, mouse, trackpad, etc.) to a user, wherein the plurality of UIs can be utilized to perceive (e.g., visually, audially, etc.) information, including information associated with the plurality of devices and/or processes, or input information, for example, to select user preferences, including user preferences relating to selection of a desired subset of conversions to employ to convert data with regard to EUs and/or language, to modify parameter values or settings associated with devices and/or processes associated with the UI component 504, etc.

In one aspect, the system 500 can comprise a HMI 506 that can include the converter component 502 and UI component 504. In some implementations, the HMI 506 can be associated with (e.g., part of) a terminal, while in other implementations, the HMI 506 can be used with another type of device having computational capabilities. The HMI 506 can be associated with (e.g., communicatively connected to) the control system 508, and can be used to facilitate monitoring and controlling the operations of the control system 508. The HMI 506 can be employed to receive input data from a user or present control system related data to the user, wherein the control system related data or other data can be converted by the converter component 502, as more fully disclosed herein, to present data to the user using a desired subset of EUs and/or a desired language. It is to be appreciated and understood that, in accordance with other embodiments, a different HMI (not shown) or device (not shown) can be employed to facilitate configuring the HMI 506 so that the HMI can facilitate monitoring and controlling the operations of the control system 508, and/or converting data, and information (e.g., code or other data) for configuring the HMI 506 can be stored on a computer-readable medium, and such information can be input to the HMI 506 to facilitate using the HMI 506 during run time to monitor and control operations of the control system 508 and/or convert data, such as control system related data.

In an aspect, the UI component 504 can include and/or provide one or more displays or monitors, such as a cathode ray tube (CRT) monitor, a Liquid Crystal Display (LCD) monitor, a plasma monitor, a light emitting diode (LED) monitor, an electrochromic monitor, or the like, to facilitate displaying information and/or items (e.g., screens, folders, controls, icons, etc.) to a user. The UI component 504 also can employ an application-control system interface component 510 that can include various adapters, connectors, controls, channels, ports, communication paths, etc., to facilitate connecting the HMI 506 to other components, devices, or systems, such as control system 508, and communication of information between the HMI 506 and other components, devices, or systems, such as control system 508. In an aspect, the HMI 506 also can be functionally coupled (e.g., communicatively coupled) with a server (not shown) that is part of a platform (factory, plant, oil rig, etc.) that includes the control system 508. In another aspect, an access network(s) can be geographically distributed and can include one or more of a wireline network or a wireless network that operate in accordance with one or more protocols—for example, packet-based protocols such as internet protocol (IP), transmission control protocol (TCP), Ethernet, Ethernet TCP/IP, Control and Information Protocol (CIP) also referred to as Ethernet/IP, X.25, Asynchronous Transfer Mode (ATM) protocol, frame-based protocols such as frame relay, and circuit-switched protocols). In still another aspect, if desired, utilizing the access network(s), one or more remote access techniques can be employed to run (e.g., operating, managing, utilizing) or at least facilitate running the application. When the one or more remote access techniques are used to run the application, the UI component 504 can or may exist on the HMI 506, but, additionally or alternatively, a remote thin client (e.g., an application control-type device) or another HMI can be connected to the HMI 506 via, for example, a wireline or wireless communication network (e.g., an IP-based network (e.g., the Internet, an intranet)), as more fully disclosed herein, wherein the remote thin client or other HMI can be providing visualization, user feedback, or other desired functionality, for using (e.g., enabling a user to use remotely) a menu or other item (e.g., screen) provided by the converter component 502, and/or presented by the UI component 504, to facilitate selecting a subset of conversions, converting data, or presenting converted data to the user.

In another aspect, the UI component 504 can provide one or more graphical user interfaces (GUIs), command line interfaces, and the like. For example, a GUI (e.g., touch screen GUI) can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. In still another aspect, the UI component 504 can receive and/or respond to a swipe gesture(s) (e.g., via a touch screen GUI), wherein a desired action (e.g., unlocking of the HMI 506 or associated display, scrolling through a menu, moving from one area of a displayed item, such as a screen, to another area of that item, adjusting the size of a displayed item, etc.). For instance, a displayed menu or screen can be sized such that it is larger than the display screen of the UI component 504. The UI component 504 can receive a particular swipe gesture via the touch screen GUI, and in response, the menu can be scrolled to display different menu items, including items that were previously outside of the display area, or a different portion of the screen can be displayed, such as a region of the screen that was previously not viewable on the display prior to the swipe gesture. Alternatively or additionally, a mouse can be used to click and drag on the screen to move the screen in the display so that the desired portion of the screen is displayed on the display; or one or more buttons (e.g., ctrl button+an arrowed or directional button) on a keyboard can be manipulated to move the screen in the display so that the desired portion of the screen is displayed on the display. In an aspect, the user can interact with one or more of the components coupled to and/or incorporated into a processor (e.g., host processor) of the processor component 512.

The user can also interact with the regions to select and provide information via various devices such as a mouse, a roller ball, a keypad, a track pad, a keyboard, a pen and/or voice activation, for example. Typically, a mechanism such as a push button or the enter key on the keyboard can be employed subsequent entering the information in order to initiate the search. However, it is to be appreciated that the disclosed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI, HMI, and/or API. In addition, the command line interface can be employed in connection with hardware (e.g., video cards) and/or displays (e.g., black and white, and EGA) with limited graphic support, and/or low bandwidth communication channels.

Further, the UI component 504 can include or can be associated with a scanner that can receive data (e.g., authentication credentials, user data, etc.) from other components (e.g., host processor) of system 500. The scanner can be a type whereby a device (e.g., smart card) containing the data can be swiped through the scanner, which can read data associated with the device and/or the scanner can be a wireless scanner (e.g., RFID-type scanner) that can receive or read data associated with a device that contains the data when the device is within a predefined area near the wireless scanner such that the wireless scanner is able to communicate with the device to read or receive the data from the device.

In an aspect, the processor component 512 can operate in conjunction with the other components (e.g., converter component 502, UI component 504, data store 514, etc.) of the HMI 506 to facilitate performing the various functions of the HMI 506. The processor component 512 can employ one or more processors, microprocessors, or controllers that can process data, such as information relating to converting data, tags, maintaining security of the HMI 506, applications, control system and data communications, monitoring and/or controlling the control system 508 using the applications, controlling access rights, controlling communication of data between the HMI 506 and other components (e.g., control system 508, etc.), etc., information relating to other operations of the system 500, and/or other information, etc., to facilitate operation of the HMI 506, as more fully disclosed herein, and control data flow between the HMI 506 and other components (e.g., control system 508, etc.) associated with the HMI 506.

The HMI 506 also can contain a data store 514 that can store data structures (e.g., user data, code, control data, metadata), code structure(s) (e.g., modules, objects, hashes, classes, procedures) or instructions, information relating to converting data, tag related data, maintaining security of the HMI 506, application, control system and data communications, monitoring and/or controlling the control system 508, controlling access rights, controlling communication of data between the HMI 506 and other components (e.g., control system 508), etc., to facilitate controlling operations associated with the HMI 506. In an aspect, the processor component 512 can be functionally coupled (e.g., through a memory bus) to the data store 514 in order to store and retrieve information desired to operate and/or confer functionality, at least in part, to the components of the HMI 506 (e.g., converter component 502, UI component 504, etc.), and/or substantially any other operational aspects of the HMI 506.

In still another aspect, the control system 508 can include a control platform 516 that can be employed to facilitate monitoring and controlling operations in the control system 508. The control platform 516 can comprise a processor component 524 that can operate in conjunction with the other components (e.g., controller component 518, equipment 520, application-control system interface component 522, etc.) of the control system 508 to facilitate performing the various functions of the control system 508. The processor component 524 can employ one or more processors, microprocessors, or controllers that can process control code to facilitate performance of operations of the control system 508, and data, such as information relating to operating conditions or parameters of the control system 508, alarm information, information relating to communication of data between the control system 508 and the HMI 506 (or other components), etc., information relating to other operations of the control system 508, and/or other information, etc., to facilitate operation of the control system 508, as more fully disclosed herein, and control data flow between the control system 508 and other components (e.g., HMI 506, etc.) associated with the control system 508.

In accordance with various embodiments, the controller component 518 in the control platform 516 can comprise one or more controllers that can be embodied in a programmable automation controller (PAC), which can be a dedicated PLC; a PC-based controller; or the like. The HMI 506 can communicate with the controller and/or other devices, such as an input/output (I/O) module, drives, motion controllers, process instruments, sensors, etc., in or associated with the control platform 516. Control code and control data structures in the control platform 516 can represent control logic that can administer equipment 520, and related processes, functionally coupled to the control platform 516. In an aspect, control platform 516 is an industrial automation control environment and the control logic is automation control logic. To facilitate operation of the control system 508, control logic can be developed during design time and/or run time, wherein the control logic can be implemented (e.g., executed) at run time. During design time (e.g., in the design environment) and/or run time (e.g., in a dynamic design environment that is engaged concurrently with a run time environment), in an aspect, instruction(s), data type(s), and metadata tag(s) that comprise control code can be produced and retained as part of configuration, or composition, of a control project or application for use in operations for the control system 508 (e.g., during run time).

In yet another aspect, the equipment 520 of the control system 508 can comprise various components or devices (e.g., conveyer belt, material distributor, mixer, measurement component, extraction component, etc.) that can perform associated process(es) (e.g., industrial process(es), manufacturing process(es), measurement process(es) in a laboratory, infrastructure development process(es), such as oil and gas prospecting and extraction, etc.). The equipment 520 generally can be specific to a production process and related market space(s) (e.g., beverages, edible goods, textile goods, oil and gas, etc.) and can include one or more sets of tools, a group of machines, numerous systems and related sub-systems, real estate and associated infrastructure, and so forth.

For example, the equipment 520 can employ a plurality of devices and/or processes. A device can be most any suitable device associated with an industrial automation environment such as, but not limited to, a physical device, a software device, an application, a virtual device, a PLC, another type of controller device, a furnace, another HMI, a computer, a disparate controller, a roller, a station, a welder, a scanner, a belt conveyor, a pump, a press, a fan, a heater, a switch, a sensor, a conveyor (e.g., conveyor belt), an actuator, material distributor, mixer, measurement component, extraction component, a portion of firmware, a portion of an application, a portion of a process, a cooler, a valve, an electrical component, a drain, a photo eye, a robot, etc. A process can be most any suitable process associated with an industrial automation environment such as, but not limited to, a mixing process, an extruding process, an injection molding process, a welding process, a melting process, a baking process, a stirring process, a measuring process, oil and gas prospecting and extraction process, other industrial process, other manufacturing process, infrastructure development process, etc.

In still another aspect, the control platform 516 also can include an application-control system interface component 522 that can include various adapters, connectors, controls, channels, ports, communication paths, etc., to facilitate connecting the control system 508 to other components, systems or devices, such as the HMI 506 and equipment 520, and communication of information (e.g., control data or code to facilitate controlling operation of the control system 508, information relating to operation of the control system 508, etc.) between the control system 508 and other components, systems, or devices, such as the HMI 506 and equipment 520.

The control system 508 also can contain a data store 526 that can store data structures (e.g., control code or data, data relating to operations of the control system 508, metadata, etc.), code structure(s) (e.g., modules, objects, hashes, classes, procedures) or instructions, information relating to operating conditions or parameters of the control system 508, alarm information, information relating to communication of data between the control system 508 and the HMI 506 (or other components), etc., to facilitate controlling operations associated with the control system 508. In an aspect, the processor component 524 can be functionally coupled (e.g., through a memory bus) to the data store 526 in order to store and retrieve information desired to operate and/or confer functionality, at least in part, to the components of the control system 508 (e.g., equipment 520, application-control system interface component 522, etc.), and/or substantially any other operational aspects of the control system 508.

Figure 6:
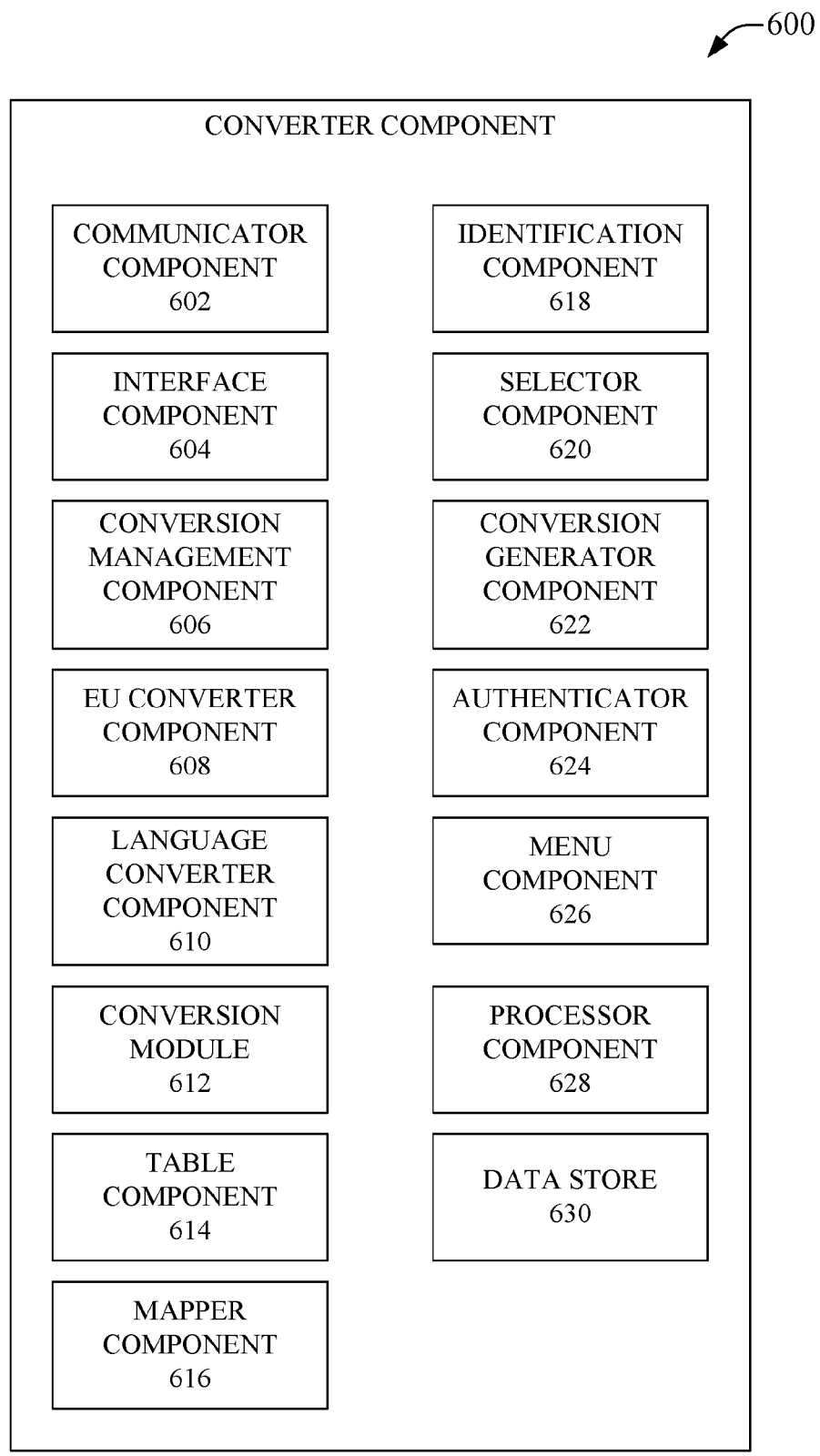
FIG. 6 illustrates a diagram of an example converter component in accordance with various embodiments and aspects.

FIG. 6 illustrates a block diagram of an example converter component 600 in accordance with various embodiments and aspects. In an aspect, the converter component 600 can include a communicator component 602 that can be employed to facilitate receiving information from or transmitting information to another component (e.g., controller, processor, automation device, etc.) associated with the converter component 600. In another aspect, the converter component 600 can include an interface component 604 that can operate in conjunction with the communicator component 602, and can employ inputs, outputs, adapters, controls, etc., to facilitate communication of information between the converter component 600 and another component.

In still another aspect, the converter component 600 can include a conversion management component 606 that can be employed to control conversion of data associated with a control system from a first subset of EUs and/or first language to a second subset of EUs and/or second language in accordance with a subset of user preferences. The conversion management component 606 can manage identification of a conversion module or conversion function to employ for a data conversion, determine whether a language conversion is to be performed, manage the generation of new conversion modules or new conversion functions, manage generation of a mapping associated with a data conversion, manage creation, modification and/or presentation of a conversion table or data (e.g., conversion related information) relating thereto, etc.

In yet another aspect, the converter component 600 can contain an EU converter component 608 that can be employed to facilitate converting data associated with a control system from a first subset of EUs to a second subset of EUs in accordance with a subset of user preferences. The converter component 600 also can include a language converter component 610 that can be employed to facilitate converting data associated with a control system from a first language to a second language in accordance with a subset of user preferences. The EU converter component 608 and language converter component 610 can operate in conjunction with a conversion module(s) 612 that can be one or more conversion modules that employ one or more conversion functions or algorithms that can be utilized to convert EUs and/or language associated with data relating to a control system.

In still another aspect, the converter component 600 can comprise a table component 614 that can be utilized to create, modify, or maintain one or more tables that respectively can comprise subsets of conversions (e.g., conversion functions), wherein the one or more tables, or information relating thereto, can be referenced by and/or presented to a user via a UI component to facilitate identifying desired data conversions, selecting desired data conversions, generating new data conversions, etc., in accordance with user preferences. A table (e.g., EU conversion table, regional industry standard conversion table, language conversion table, etc.) can be pre-populated with a set of potentially desired conversions, wherein the pre-populated set of potentially desired conversions can be modified and/or other conversions (e.g., custom conversion functions) can be created and added to the table, if desired.

In an aspect, the converter component 600 can include a mapper component 616 that can generate, modify, and/or maintain a mapping of types of data or tags to conversion functions, a mapping of data conversions to items contained in one or more tables, mapping of authentication credentials or user identifiers to a subset of conversions, or other desired mappings, in accordance with user preferences of respective users and the predefined conversion criteria. In still another aspect, the converter component 600 can include an identification component 618 that can be employed to identify information, including a tag, type of automation device, a user identifier, authentication credentials, data type, conversion type, conversion function, language type, etc., to facilitate determining what type of conversion to perform in relation to an item of data associated with a control system.

In another aspect, the converter component 600 also can comprise a selector component 620 that can enable a user to select and set user preferences, select conversion modules or conversion functions for EU conversions or language conversions, etc. The converter component 600 also can contain a conversion generator component 622 that can be used to create or modify a conversion module, conversion function, subset of conversions, etc.

In still another aspect, the converter component 600 can include an authenticator component 624 that can be employed to authenticate or verify users attempting to access a HMI and/or an application, such as a conversion application associated with the converter component 600, associated with the control system. The authenticator component 624 can receive authentication credentials (e.g., username, password, personal identification number (PIN), radio frequency identification (RFID) information, smart card information, and/or biometric authentication credentials (e.g., fingerprint information, information relating to facial recognition, information relating to an eye scan, etc.), etc.) from a user via the UI component and/or interface component 604.

In another aspect, the authentication credentials can be provided to the UI component or interface component 604 by a user using a touch screen interface, keyboard or keypad, mouse, biometric interface, magnetic stripe reader, RFID reader, bar code reader (e.g., scanner), smart card reader, or other desired interface of the UI component or interface component 604. In an embodiment, the user can have an identification (ID) card (e.g., employee ID card, RFID tag, and/or smart card, etc.) that can comprise the user's authentication credentials, or a portion thereof (e.g., stored on the ID card).

Upon receiving authentication credentials from a user, the authentication component 624 can compare the received authentication credentials to stored valid authentication credentials (e.g., stored in the data store 628) to determine whether the received authentication credentials are valid and, if so, to facilitate identifying the user associated with the authentication credentials; identifying a subset of access rights that can be granted to an authenticated user to access the HMI and/or terminal, data and/or the control system; identifying a subset of user preferences associated with the user; and/or identifying a subset of conversions to be employed with regard to data, including control system related data, to convert the data and present the converted data to the user. If the received authentication credentials match any of the stored valid authentication credentials, the received authentication credentials can be identified as valid and the user can be deemed authenticated. If the received authentication credentials do not match any of the stored valid authentication credentials, the authenticator component 624 can determine that the received authentication credentials are not valid and the authentication component 624 can deny the user access to the HMI and/or terminal, application, or data. In such instance, the authentication component 624 can facilitate prompting the user to attempt to provide valid authentication credentials up to a predefined maximum number of access attempts, wherein, if the maximum number of attempts is reached without valid authentication credentials being presented, further attempts to access the HMI, terminal or application can be denied for at least a predefined amount of time and/or a notification of the authentication failure can be communicated to a desired entity (e.g., plant manager, supervisor, security person, etc.).

In yet another aspect, the converter component 600 can comprise a menu component 626 that can provide one or more menus to a user via the UI component to facilitate selection of conversion functions to be utilized to convert data associated with a control system. For instance, the menu component 626 can provide a menu comprising available EUs, a menu containing available conversion functions, and/or a menu comprising available language translations to a user via the UI component to facilitate selection, creation, or modification of conversion functions. In an embodiment, a menu can be a drop down menu that can be presented in response to selection of a cell in a conversion table (e.g., the menu can drop down from the selected cell), or can be a drop down menu that drops down in a region near a tool bar in response to making a selection in a tool bar. The user can select a desired EU, conversion function, language, regional industry standard, or other items presented in a menu to engage, select, apply, view, etc., the item.

In an aspect, the converter component 600 can comprise a processor component 628 that can operate in conjunction with the other components (e.g., communicator component 602, interface component 604, conversion management component 606, etc.) of the converter component 600 to facilitate performing the various functions of the converter component 600. The processor component 628 can employ one or more processors, microprocessors, or controllers that can process data, such as information relating to: user preferences; predefined conversion criteria; authentication credentials and/or user identifier information; converting data in relation to EUs and/or language; creating, maintaining or modifying tables, mappings, conversion modules, conversion functions, etc.; EU conversions; language conversions; application(s); maintaining security of the HMI, terminal, application(s), control system and data communications; controlling communication of data between the converter component 600 and other components (e.g., UI component, control system, etc.); etc., information relating to other operations of the converter component 600, and/or other information, etc., to facilitate operation of the converter component 600, as more fully disclosed herein, and control data flow between the converter component 600 and other components (e.g., UI component, control system, etc.) associated with the converter component 600.

The converter component 600 also can contain a data store 630 that can store data structures (e.g., user data, code, control data, metadata), code structure(s) (e.g., modules, objects, hashes, classes, procedures) or instructions, information relating to: user preferences; predefined conversion criteria; authentication credentials and/or user identifier information; converting data in relation to EUs and/or language; creating, maintaining or modifying tables, mappings, conversion modules, conversion functions, etc.; EU conversions; language conversions; application(s); maintaining security of the HMI, terminal, application(s), control system and data communications; controlling communication of data between the converter component 600 and other components (e.g., UI component, control system, etc.); etc., to facilitate controlling operations associated with the converter component 600. In an aspect, the processor component 628 can be functionally coupled (e.g., through a memory bus) to the data store 630 in order to store and retrieve information desired to operate and/or confer functionality, at least in part, to the components of the converter component 600 (e.g., communicator component 602, interface component 604, conversion management component 606, etc.), and/or substantially any other operational aspects of the converter component 600.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems described above, example methods that can be implemented in accordance with the disclosed subject matter can be better appreciated with reference to flowcharts in FIGS. 7-12. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Figure 7:
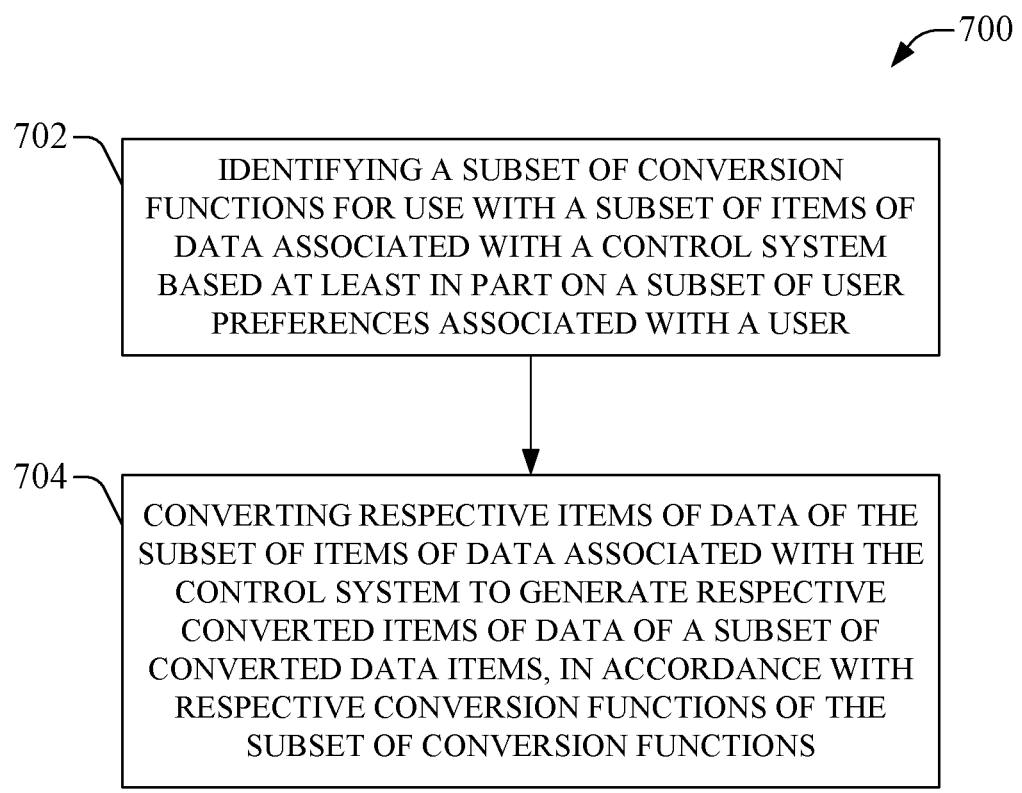
FIG. 7 presents a flowchart of an example method for converting data associated with a control system in accordance with various aspects and embodiments of the disclosed subject matter.

FIG. 7 is a flowchart of an example method 700 for converting data associated with a control system in accordance with various aspects and embodiments of the disclosed subject matter. At 702, a subset of conversion functions for use with a subset of items of data associated with a control system can be identified based at least in part on a subset of user preferences associated with a user (e.g., control system operator, maintenance technician). The subset of conversion functions can comprise respective conversion functions that can be applied to respective items of data associated with the control system to convert the items of data from a first data value based on a first EU or first language to a different data value based on a second EU or second language, in accordance with the subset of user preferences and the subset of conversion functions employed by the converter component. At 704, respective items of data of the subset of items of data associated with the control system can be converted to generate respective converted items of data of a subset of converted data items, in accordance with respective conversion functions of the subset of conversion functions.

Figure 8:
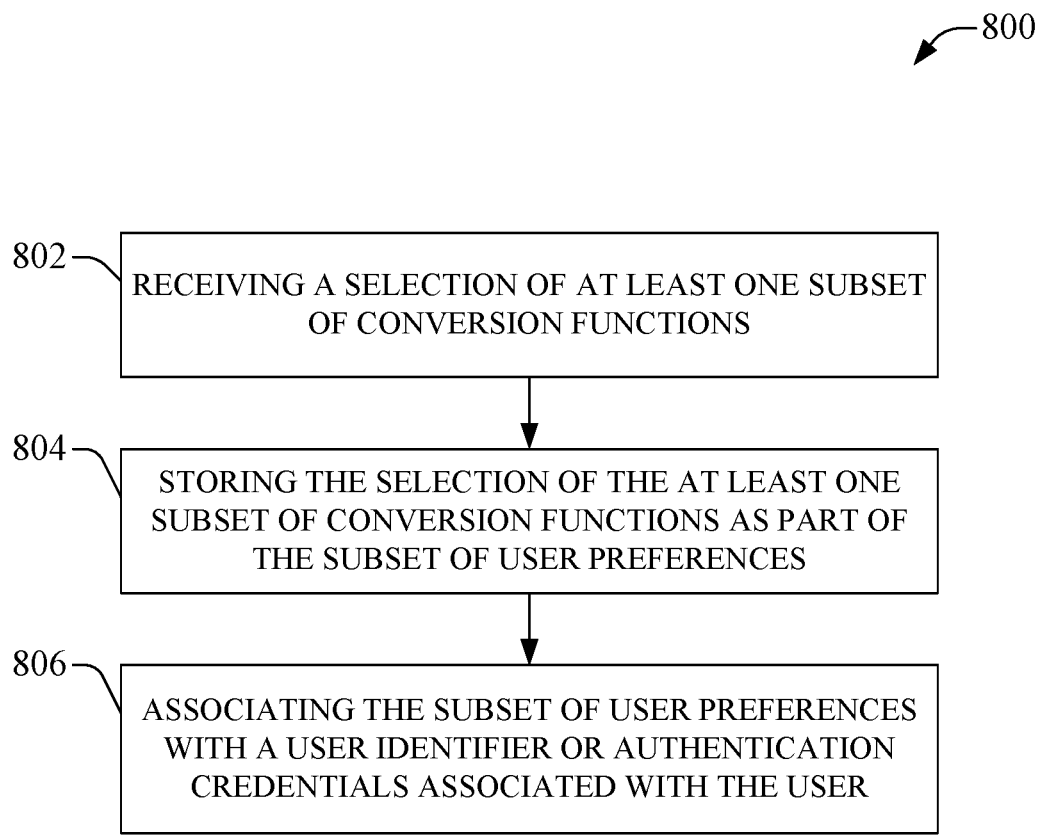
FIG. 8 illustrates a flow diagram of an example method for selecting conversion functions to facilitate converting data associated with a control system in accordance with various aspects and embodiments of the disclosed subject matter.

FIG. 8 presents a flowchart of another example method 800 for selecting conversion functions to facilitate converting data associated with a control system in accordance with various aspects and embodiments of the disclosed subject matter. At 802, a selection of at least one subset of conversion functions can be received, for example, from a user via a UI component. The at least one subset of conversion functions can be part of or associated with a pre-populated table comprising a plurality of different subsets of conversion functions that can be employed to convert items of data associated with the control system in relation to EUs and/or language to generate corresponding converted items of data for presentation to the user via the UI component. The at least one subset of conversion functions can comprise, for example, a first subset of conversion functions that includes a plurality of conversion functions to convert data values of the respective items of data from a first data value associated with a first EU to a second data value associated with a second EU, a second subset of conversion functions that includes a plurality of conversion functions to convert data values or associated EUs of the respective items of data from a first language to a second language; or the at least one subset of conversion functions can comprise a single subset of conversion functions that can combine EU conversions and language conversions to facilitate converting the items of data. In an aspect, the subset of conversion functions optionally can include language conversion or translation functions, such as more fully disclosed herein, and/or selection of the subset of conversions can be based at least in part on a regional (e.g., country) industry standard (e.g., associated with a particular language and/or country) with regard to EUs to employ when presenting items of data to a user.

At 804, the selection of the at least one subset of conversion functions can be saved or stored as part of the subset of user preferences. At 806, the subset of user preferences can be associated with a user identifier or authentication credentials associated with the user. In an aspect, a mapping can be created between the user preferences and the user identifier or authentication credentials to facilitate identifying which subset(s) of conversion functions to use to convert the items of data to generate corresponding converted items of data for presentation to the user via the UI component.

Figure 9:
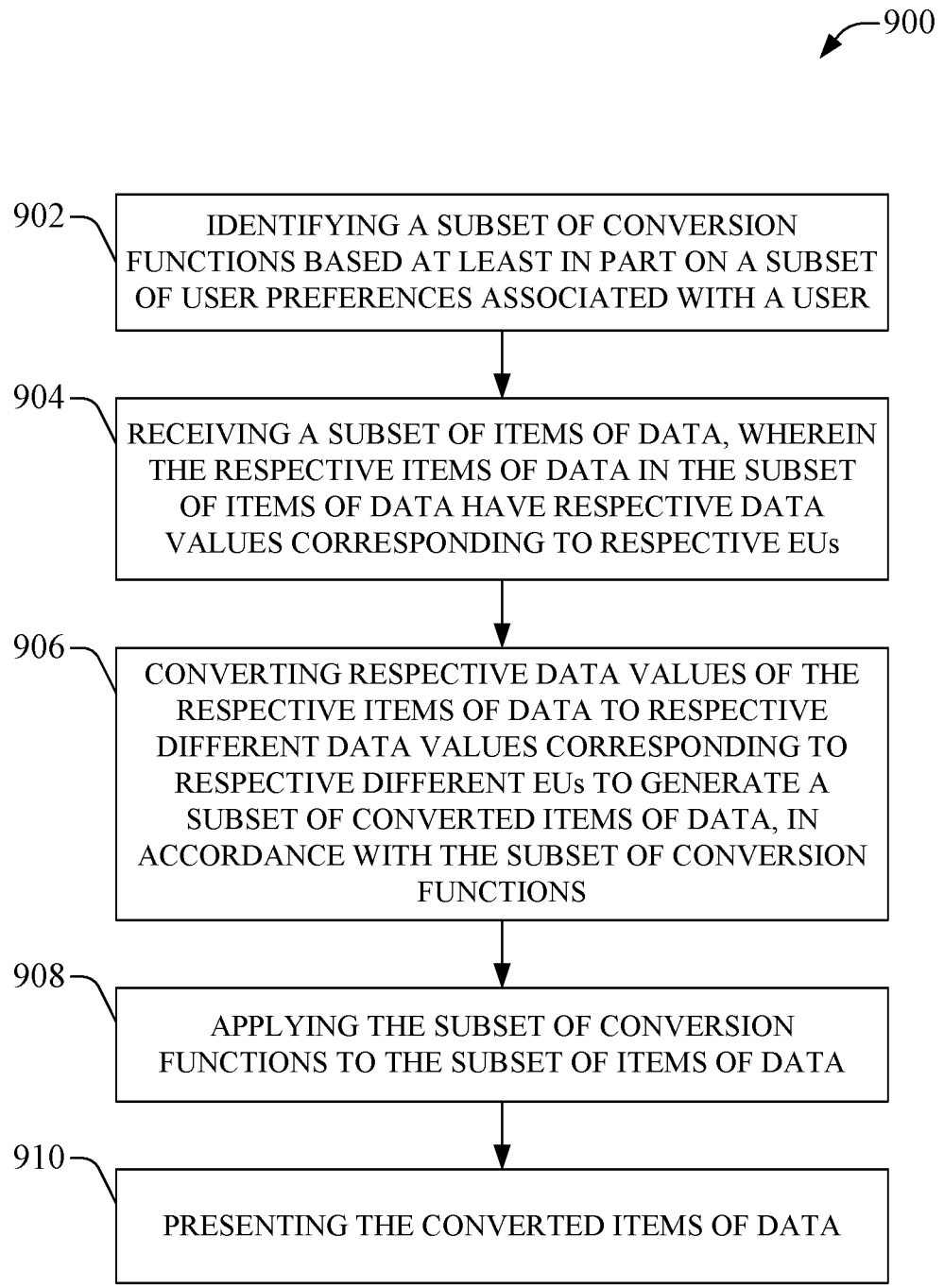
FIG. 9 illustrates a flow diagram of an example method for converting data values to different EUs in accordance with aspects of the disclosed subject matter.

FIG. 9 illustrates a flowchart of an example method 900 for converting data values to different EUs in accordance with aspects of the disclosed subject matter. At 902, a subset of conversion functions can be identified based at least in part on a subset of user preferences associated with a user. For instance, the user can select the subset of conversion functions at a desired time (e.g., at the moment the user is using the UI component to receive the items of data associated with the control system); or the user can select the subset of conversion functions and can store such selection in the user's user preferences, and the user preferences can be identified based at least in part on a user identifier or authentication credentials received or obtained from the user via the UI component, wherein the user identifier or authentication credentials can be mapped to the user preferences, including the subset of conversion functions, associated with the user. In an aspect, the subset of conversion functions can comprise respective conversion functions, wherein a respective conversion function can convert a data value of respective item of data corresponding to a first EU to a different data value corresponding to a second EU.

At 904, a subset of items of data can be received, wherein the respective items of data in the subset of items of data have respective data values corresponding to respective EUs. At 906, the subset of conversion functions can be applied to the subset of items of data. At 908, respective data values of the respective items of data can be converted to respective different data values corresponding to respective different EUs to generate a subset of converted items of data, in accordance with the subset of conversion functions. At 910, the converted items of data can be presented, for example, to the user via the UI component.

Figure 10:
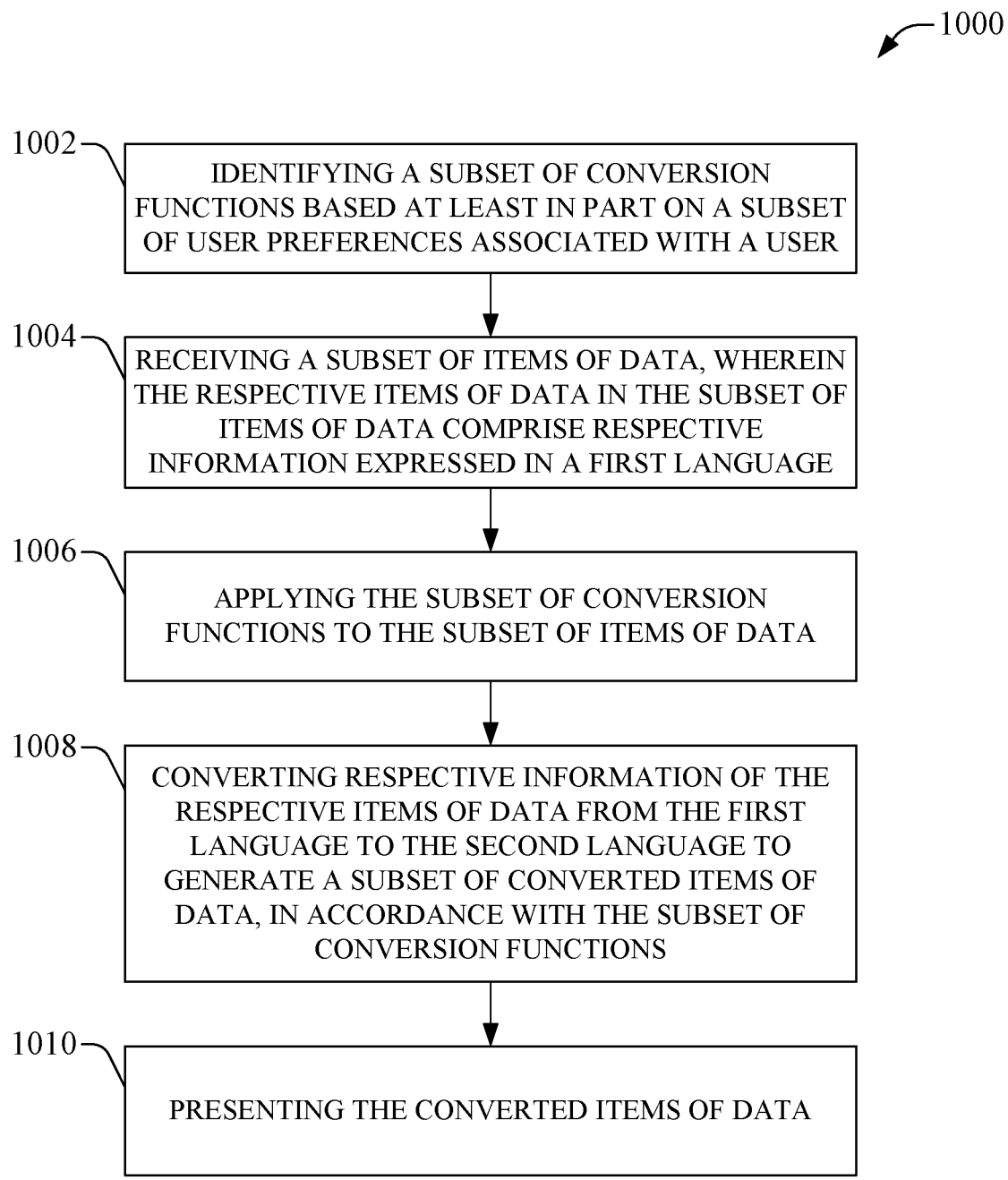
FIG. 10 presents a flow diagram of an example method for converting information relating to items of data associated with a control system from a first language to a second language in accordance with aspects of the disclosed subject matter.

FIG. 10 depicts a flowchart of an example method 1000 for converting information relating to items of data associated with a control system from a first language to a second language in accordance with aspects of the disclosed subject matter. The method 1000 can be employed on its own and/or can be employed with other acts that can convert items of data from being expressed in one type of EU to being expressed in another type of EU, as more fully described herein. At 1002, a subset of conversion functions can be identified based at least in part on a subset of user preferences associated with a user. For instance, the user can select the subset of conversion functions at a desired time (e.g., at the moment the user is using the UI component to receive the items of data associated with the control system); or the user can select the subset of conversion functions and can store such selection in the user's user preferences, and the user preferences can be identified based at least in part on a user identifier or authentication credentials received or obtained from the user via the UI component, wherein the user identifier or authentication credentials can be mapped to the user preferences, including the subset of conversion functions, associated with the user. In an aspect, the subset of conversion functions can comprise respective conversion functions, wherein a respective conversion function can convert information relating to a respective item of data corresponding to a first language to a second language.

At 1004, a subset of items of data can be received, wherein the respective items of data in the subset of items of data comprise respective information expressed in a first language. At 1006, the subset of conversion functions can be applied to the subset of items of data. At 1008, respective information of the respective items of data can be converted from the first language to the second language to generate a subset of converted items of data, in accordance with the subset of conversion functions. At 1010, the converted items of data can be presented, for example, to the user via the UI component.

It is to be appreciated and understood that, as desired, the method 900 and method 1000 can be combined, and/or a hybrid method comprising method 900 and method 1000 can be employed, to facilitate converting items of data associated with a control system for desired presenting of converted items of data to a user via a UI component.

Figure 11:
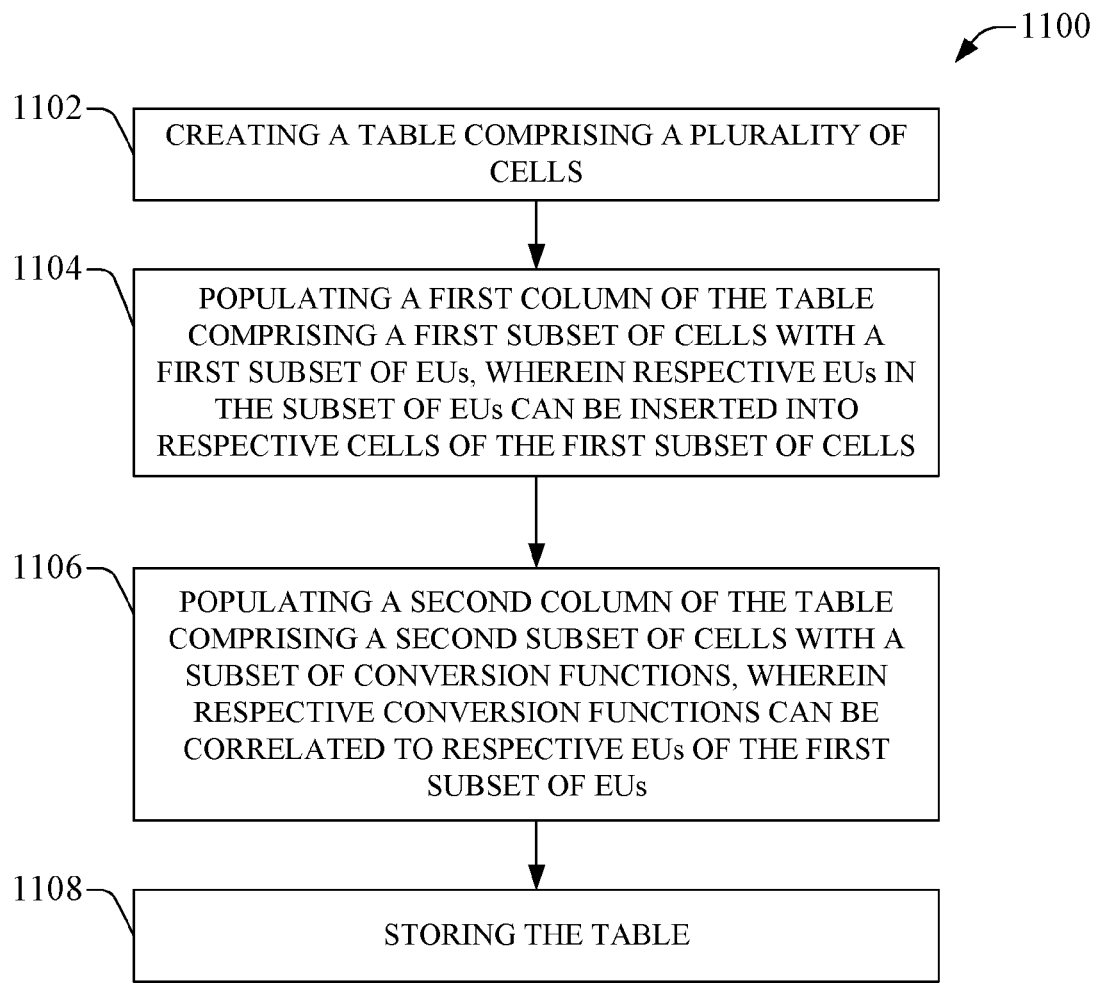
FIG. 11 depicts a flow diagram of an example method for creating a conversion table pre-populated with one or more subsets of conversion functions in accordance with aspects of the disclosed subject matter.

FIG. 11 depicts a flowchart of an example method 1100 for creating a conversion table pre-populated with one or more subsets of conversion functions in accordance with aspects of the disclosed subject matter. At 1102, a table, comprising a plurality of cells, can be created. At 1104, a first column of the table comprising a first subset of cells can be populated with a first subset of EUs, wherein respective EUs in the subset of EUs can be inserted into respective cells of the first subset of cells. The respective EUs in the subset of EUs can be the EUs that are used by the respective automation devices associated with the control system. For instance, a sensor can present an item of data using the EU of pounds.

At 1106, a second column of the table comprising a second subset of cells can be populated with a subset of conversion functions, wherein respective conversion functions can be correlated to respective EUs of the first subset of EUs to produce desired data value conversions to convert data values expressed using the EUs in the first subset of cells to converted data values expressed in different EUs in accordance with the respective conversion functions. The different EUs can be based at least in part on the type of EU desired by the user, the language to be employed when presenting converted items of data, and/or a regional industry standard relating to EUs. For instance, if an item of data, such as an item of data received from a sensor, is presented by the sensor using the EU of pounds, but it is desired that the data value of the item of data be presented in kilograms, a conversion function, which converts a data value of the item of data expressed in the EU of pounds to a different data value expressed in the EU of kilograms, can be inserted into the corresponding cell of the second subset of cells that correlates to the cell in the first subset of cells that contains the EU of pounds. As desired, one or more additional subsets of cells of one or more additional columns of the table can be populated (e.g., pre-populated) or modified in accordance with act 1106.

At 1108, the table can be stored. For instance, the table, as pre-populated or modified, can be stored in a data store associated with the converter component. As desired, the method 1100 also can be used to modify, add, or remove an EU(s) and a corresponding conversion function(s)

Figure 12:
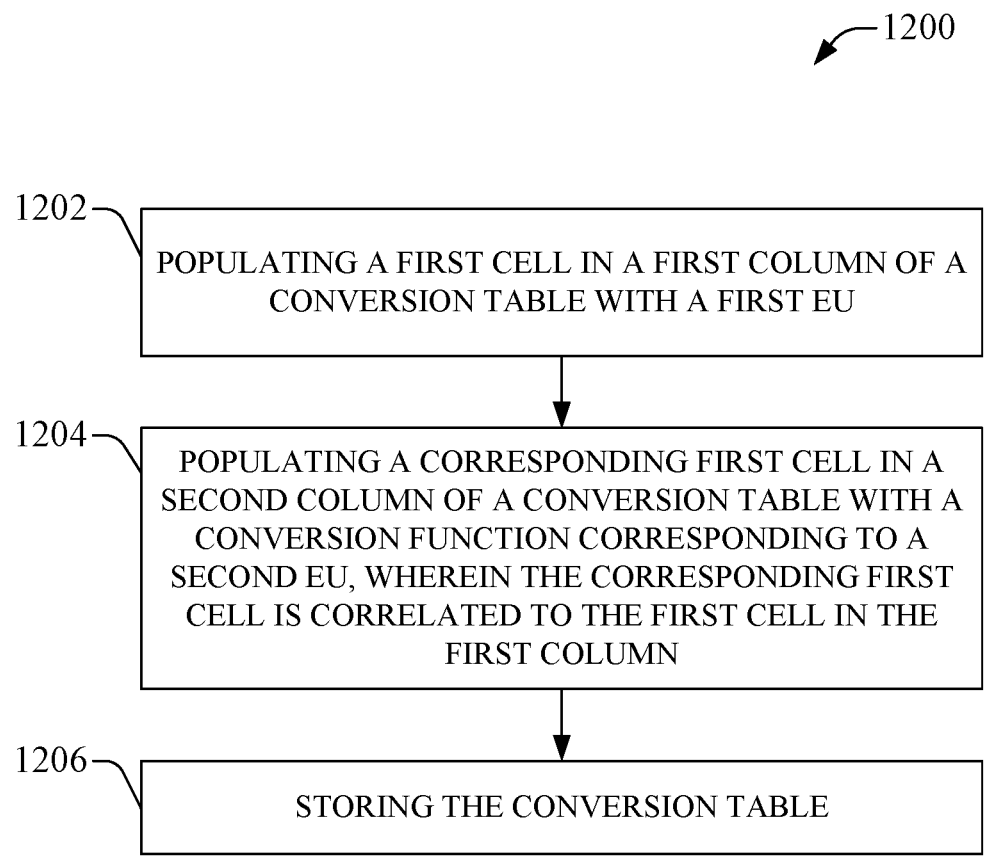
FIG. 12 illustrates a flow diagram of an example method for creating a new data conversion to convert an item of data associated with a control system in accordance with aspects of the disclosed subject matter.

FIG. 12 presents a flowchart of an example method 1200 for creating a new data conversion to convert an item of data associated with a control system in accordance with aspects of the disclosed subject matter. At 1202, a first cell in a first column of a conversion table can be populated with a first EU. The first EU can be the EU that is used by an automation device(s) associated with the control system when the automation device(s) presents data (e.g., to the converter component or UI component). For instance, a sensor can present an item of data using the EU (e.g., first EU) of pounds. However, a user can desire that items of data having data values expressed using the first EU (e.g., pounds) be expressed in the form corresponding to a second EU (e.g., kilograms).

At 1204, a corresponding first cell in a second column of a conversion table can be populated with a conversion function corresponding to a second EU, wherein the corresponding first cell is correlated (e.g., linked) to the first cell in the first column. For instance, a conversion function can be inserted into the corresponding first cell of the second column, wherein the conversion function, when applied to the data value expressed using the first EU, can yield a result having a second data value expressing the data using the second EU. At 1206, the conversion table, comprising the new data conversion, can be stored, for example, in a data store. The conversion table can be employed when desired to convert data in accordance with the new data conversion, in accordance with the predefined conversion criteria.

One or more methods disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute computer-executable code instructions retained in a memory, or any computer-readable or machine-readable medium, to implement method(s) described herein; the code instructions, when executed by the one or more processor implement or carry out the various acts in the method(s) described herein. The computer-executable code instructions provide a computer-executable or machine-executable framework to enact, or implement, the method(s) described herein.

Figure 13:
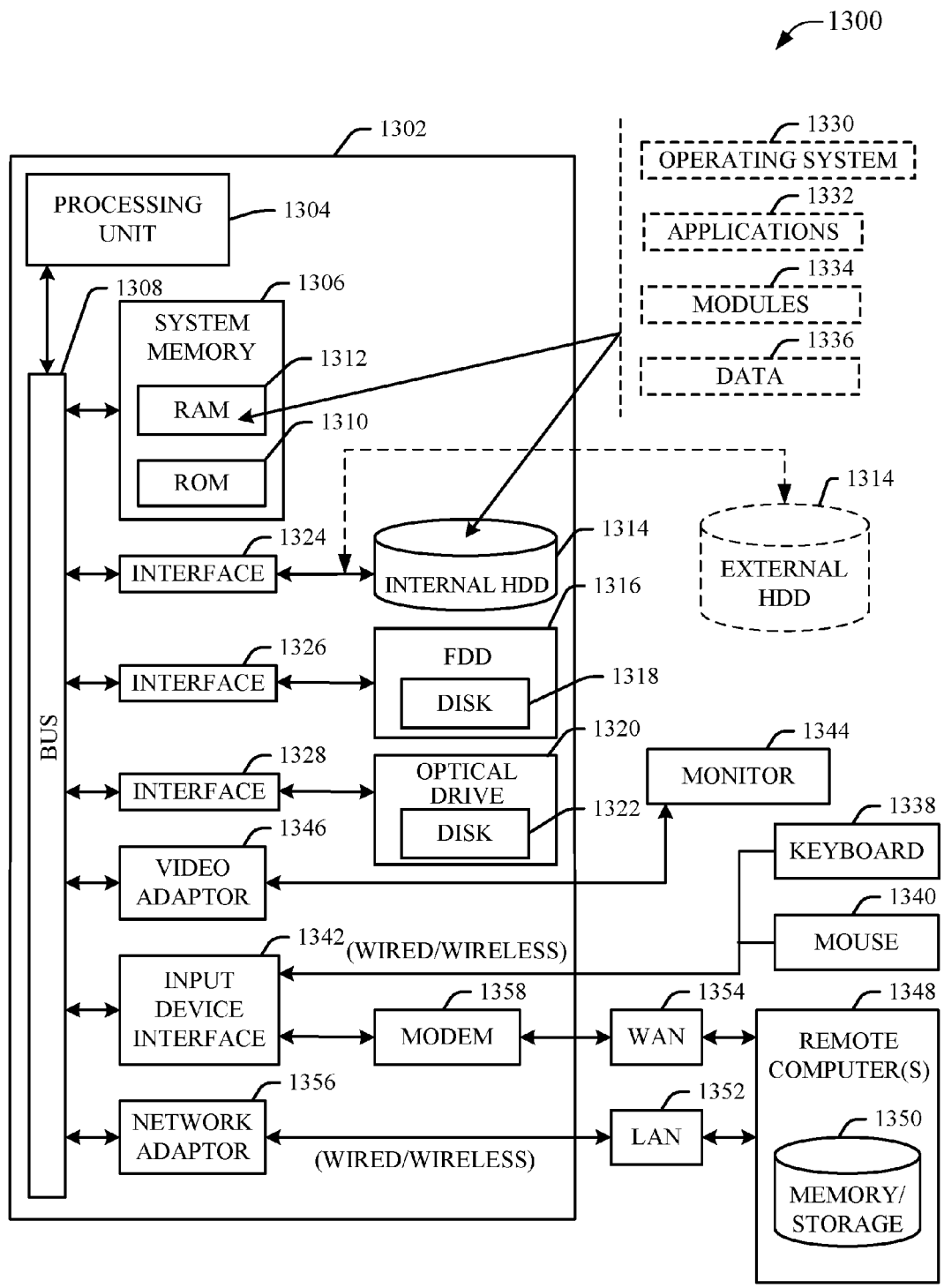
FIG. 13 depicts a block diagram of a computer operable to execute the disclosed architecture.

Referring now to FIG. 13, there is illustrated a block diagram of a computer operable to execute the disclosed architecture. In order to provide additional context for various aspects thereof, FIG. 13 and the following discussion are intended to provide a brief, general description of a suitable computing environment 1300 in which the various aspects of the disclosed subject matter can be implemented. While the description above is in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter also can be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

A computer and computing devices in general typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multiprocessor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (e.g., external DDD), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Interface 1324 enables functional coupling of computer 1302 to a removable memory, such as a USB memory device or a SD memory card. Other external drive connection technologies are within contemplation of the disclosed subject matter.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the disclosed subject matter can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are illustrative and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4, 3.6, and 5 GHz radio bands, at up to an 11 Mbps (802.11a), 54 Mbps (802.11b or 802.11b), or 150 Mbps (802.11n) data rate, for example, or with products that contain both bands (dual band), so the networks can provide real-world performance similar to the basic 10BaseT wired Ethernet networks used in many offices.

Figure 14:
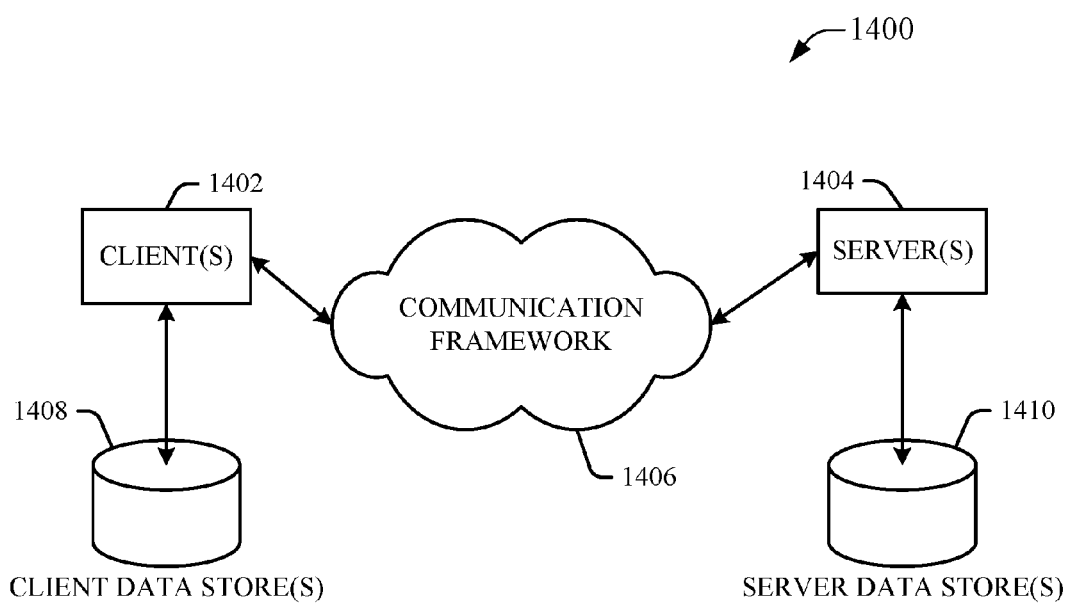
FIG. 14 illustrates a schematic block diagram of an example computing environment.

Referring now to FIG. 14, there is illustrated a schematic block diagram of an example computing environment 1400 in accordance with another aspect. The system 1400 includes one or more client(s) 1402. The client(s) 1402 can be hardware and/or software (e.g., threads, processes, computing devices). The client(s) 1402 can house cookie(s) and/or associated contextual information by employing the disclosed subject matter, for example.

The system 1400 also includes one or more server(s) 1404. The server(s) 1404 can also be hardware and/or software (e.g., threads, processes, computing devices). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) or associated contextual information). Similarly, the server(s) 1404 are operatively connected to one or more server data store(s) 1410 that can be employed to store information local to the servers 1404.

In the subject specification and annexed drawings, terms such as "repository," "store," "data store," data storage," and substantially any term(s) that convey other information storage component(s) relevant to operation and functionality of a functional element or component described herein, refer to "memory components," or entities embodied in a "memory" or components comprising the memory. The memory components described herein can be either volatile memory or nonvolatile memory, or can include both volatile and nonvolatile memory. In addition, the memory components described herein can be statically affixed (screwed, bolted, soldered, etc.) or removably affixed. Further, the memory components can include computer-readable or machine-readable storage media.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device (e.g., a PAC), discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps or acts of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal or HMI. In the alternative, the processor and the storage medium may reside as discrete components in a user terminal or HMI. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed subject matter. It is, of course, not possible to describe every conceivable combination of components and/or methods, but one of ordinary skill in the art may recognize that many further combinations and permutations are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor configured to execute one or more sets of code instructions retained in at least one memory, the one or more sets of code instructions, when executed by the at least one processor, implement components, comprising:
   a user interface component configured to present a set of items of data or a set of converted items of data associated with a control system; and
   a converter component configured to identify a set of conversion functions usable to convert at least a portion of the set of items of data based at least in part on a set of user preferences associated with a user, and convert respective items of data of the set of items of data to generate respective converted items of data of the set of converted items of data, in accordance with respective conversion functions of the set of conversion functions, wherein an item of data of the set of items of data is associated with information that is in a first language based at least in part on a first geographical regional industry standard associated with a geographical location of the control system, wherein an engineering unit associated with the item of data is based at least in part on the first geographical regional industry standard, and wherein the converter component is configured to at least one of convert the information associated with the item of data from the first language to a second language associated with a second geographical regional industry standard or convert the engineering unit associated with the first geographical regional industry standard to a second engineering unit associated with the second geographical regional industry standard, based at least in part on the set of user preferences and at least one of a language conversion function or an engineering unit conversion function of the set of conversion functions that is or are determined based at least in part on metadata that is associated with the item of data and related to the engineering unit conversion function.

2. The system of claim 1, wherein a second item of data of the set of items of data is associated with information that is in the first language based at least in part on the first geographical regional industry standard associated with the control system, wherein a second engineering unit associated with the second item of data is based at least in part on the first geographical regional industry standard, and wherein the converter component is further configured to identify the second engineering unit associated with the second item of data based at least in part on second metadata associated with the second item of data and obtained from the automation device in the control system, identify a second language conversion function based at least in part on the second metadata and a first user preference of the set of user preferences to facilitate translation of the information to the second language used by the user and associated with the second geographical regional industry standard based at least in part on the second language conversion function, and maintain a data value associated with the second item of data to express the second item of data using the second engineering unit based at least in part on a second user preference of the set of user preferences that indicates data values associated with the second item of data are to be expressed using the second engineering unit associated with the first geographical regional industry standard without regard to the second geographical regional industry standard associated with the second language specifying that the data values associated with the second item of data are to be expressed using a different engineering unit than the second engineering unit.

3. The system of claim 1, wherein the converter component is further configured to obtain the metadata associated with the item of data from the automation device that is associated with the item of data.

4. The system of claim 3, wherein the metadata comprises indicates a type of the engineering unit associated with the item of data.

5. The system of claim 4, wherein the metadata comprises control code relating to the engineering unit conversion function, and wherein the control code relating to the engineering unit conversion function facilitates the conversion of the item of data to a converted item of data of the set of converted items of data based at least in part on the engineering unit conversion function.

6. The system of claim 1, wherein the converter component is further configured to comprise a set of conversion tables, wherein a first conversion table of the set of conversion tables comprises at least a first column and a second column, wherein the first column is pre-populated with a set of engineering units and the second column is pre-populated with the set of conversion functions that are respectively correlated to the set of engineering units and facilitate conversion of respective data values expressed in respective engineering units of the set of engineering units to respective different data values expressed in respective different engineering units.

7. The system of claim 6, wherein the user interface component is further configured to receive conversion-related information from the user for at least one of: generation of a new conversion function, modification of a specified conversion function in the set of conversion functions, or removal of another specified conversion function from the set of conversion functions, wherein the generation of the new conversion function or the modification of the specified conversion function is associated with at least one of conversion of an engineering unit or conversion of a language in relation to the item of data of the set of items of data, and to provide the conversion-related information to the converter component, and
wherein the converter component is further configured to at least one of: generate the new conversion function and add the new conversion function to the set of conversion functions, modify the specified conversion function, or remove the other specified conversion function from the set of conversion functions.

8. The system of claim 6, wherein the first conversion table is configured to be presented via the user interface component and comprises a set of cells, wherein at least one cell of the set of cells is associated with a menu comprising a set of available conversion functions that are selectable for use in the set of conversion functions.

9. The system of claim 6, wherein the converter component is configured to generate a third column in the first conversion table and a custom set of conversion functions associated with one or more users of a user class in response to received information that indicates at least one custom conversion function to be included in the custom set of conversion functions, wherein the converter component is configured to populate the third column with the custom set of conversion functions, which are respectively correlated to at least a portion of the set of engineering units.

10. The system of claim 1, wherein the set of conversion functions is determined as a function of at least one of a geographical regional industry standard or a language selected for presentation of information associated with the control system via the user interface component.

11. The system of claim 10, wherein the converter component is further configured to translate information associated with the set of items of data from the first language to the second language in accordance with the language selected, wherein the language selected determines at least in part one or more conversions functions that are to be included in the set of conversion functions.

12. A method, comprising:
identifying, by a system comprising a processor, a first conversion function relating to a first engineering unit based at least in part on a first tag associated with a first item of data associated with an automation device of a control system and a set of user preferences associated with a user, wherein the first tag comprises operational settings data relating to the first conversion function, wherein the first item of data is associated with information that is in a first language based at least in part on a first geographical regional industry standard associated with a geographical location of the control system, and wherein a first engineering unit associated with the first item of data is based at least in part on the first geographical regional industry standard; and
converting, by the system, at least one of the information associated with the first item of data from the first language to a second language associated with a second geographical regional industry standard or the first engineering unit associated with the first geographical regional industry standard to a second engineering unit associated with the second geographical regional industry standard, based at least in part on the set of user preferences and at least one of the first conversion function or a second conversion function relating to language conversion that is or are determined based at least in part on the first tag that is related to the first conversion function.

13. The method of claim 12, further comprising:
receiving, by the system, at least one of a user identifier or authentication credentials associated with the user;
identifying, by the system, the set of user preferences corresponding to at least one of the user identifier or the authentication credentials associated with the user;
identifying, by the system, a subset of conversion functions associated with the set of user preferences; and
utilizing, by the system, at least a portion of the subset of conversion functions to convert respective items of data of a set of items of data to generate respective converted items of data of a set of converted items of data.

14. The method of claim 12, further comprising:
receiving, by the system, the first item of data;
analyzing, by the system, the set of user preferences and a conversion table to locate the first engineering unit;
identifying, by the system, the first conversion function based at least in part on a result of the analyzing the set of user preferences and the conversion table; and
applying, by the system, the first conversion function to the first item of data to convert a first data value of the first item of data to a second data value corresponding to a second engineering unit associated with the first conversion function to generate a first converted item of data.

15. The method of claim 12, further comprising:
creating, by the system, a conversion table;
inserting, by the system, a set of engineering units in respective cells of a first column of the conversion table;
selecting, by the system, a set of conversion functions;
inserting, by the system, respective conversion functions of the set of conversion functions into respective cells of a second column of the conversion table, wherein the respective conversions functions are correlated with respective engineering units of the set of engineering units; and
storing, by the system, the conversion table.

16. The method of claim 12, further comprising:
creating, by the system, a conversion table that facilitates converting a set of items of data associated with the control system in accordance with at least one of a selected language or a selected geographical regional industry standard;
inserting, by the system, a set of engineering units in respective cells of a first column of the conversion table;
selecting, by the system, at least one of a set of disparate engineering units or a set of conversion functions, wherein the at least one of the set of disparate engineering units or the set of conversion functions corresponds to at least one of the selected language or the selected geographical regional industry standard;
inserting, by the system, at least one of respective disparate engineering units of the set of disparate engineering units or respective conversion functions of the set of conversion functions into respective cells of a second column of the conversion table, wherein the respective disparate engineering units or the respective conversions functions are correlated with respective engineering units of the set of engineering units; and storing, by the system, the conversion table.

17. The method of claim 16, further comprising:

translating, by the system, information associated with the set of items of data from the first language to the second language to generate translated information, in accordance with the set of conversion functions;

associating, by the system, the translated information with a set of converted items of data that have been converted from the set of items of data based at least in part on the set of conversion functions; and presenting, by the system, the set of converted items of data with the translated information.

18. The method of claim 12, further comprising:

receiving, by the system, a command to at least one of generate a new conversion function or modify a specified conversion function in a set of conversion functions;

receiving, by the system, selection of a conversion function;

associating, by the system, the conversion function with an engineering unit; and storing, by the system, the set of conversion functions comprising the conversion function.

19. The method of claim 12, further comprising:

generating, by the system, a mapping associated with the set of user preferences, wherein the generating the mapping comprising:

generating a first mapping of the set of user preferences to a set of conversion functions, and generating a second mapping of the set of user preferences to at least one of a user identifier associated with the user or an authentication credential associated with the user; and identifying, by the system, the set of conversion functions based at least in part on at least one of the user identifier or the authentication credential and the mapping associated with the set of user preferences.

20. A computer-readable storage medium comprising executable instructions that, when executed by a processor, facilitate performance of operations, comprising:

determining a conversion function relating to an engineering unit based at least in part on metadata associated with an item of data associated with an automation device of a control system and a set of user preferences associated with a user and a set of user preferences, wherein the metadata comprises operational settings data relating to the conversion function, wherein the item of data is associated with information that is in a first language based at least in part on a first geographical regional industry standard associated with a first geographical location of the control system, and wherein the engineering unit associated with the item of data is based at least in part on the first geographical regional industry standard; and converting at least one of the information associated with the item of data from the first language to a second language associated with a second geographical regional industry standard associated with a second geographical location that is different from the first geographical location or the engineering unit associated with the first geographical regional industry standard to a second engineering unit associated with the second geographical regional industry standard, based at least in part on the set of user preferences and at least one of the conversion function or a second conversion function relating to language conversion that is or are determined based at least in part on the metadata that is related to the conversion function.

\* \* \* \* \*